US007898789B1

(12) United States Patent
Jarvinen

(10) Patent No.: US 7,898,789 B1
(45) Date of Patent: Mar. 1, 2011

(54) EXTRA ELECTRIC ENERGY FOR DAY-NIGHT CYCLE SOLAR AIRCRAFT

(76) Inventor: Philip Onni Jarvinen, Amherst, NH (US)

(\*) Notice: Subject to any disclaimer, the term of this patent is extended or adjusted under 35 U.S.C. 154(b) by 0 days.

(21) Appl. No.: 12/590,058

(22) Filed: Nov. 2, 2009

(51) Int. Cl.
*H05F 3/00* (2006.01)
(52) U.S. Cl. .................................................. 361/218
(58) Field of Classification Search ................... 361/218
See application file for complete search history.

(56) References Cited

U.S. PATENT DOCUMENTS

| 4,415,133 | A | * | 11/1983 | Phillips ........................ 244/53 R |
| 5,518,205 | A | * | 5/1996 | Wurst et al. ..................... 244/58 |
| 6,407,535 | B1 | * | 6/2002 | Friedman et al. ............. 322/2 R |
| 7,592,783 | B1 | | 9/2009 | Jarvinen |
| 7,654,073 | B2 | * | 2/2010 | Primlani ................... 60/39.183 |

OTHER PUBLICATIONS

"Sampling Dust From the Stratosphere", Hodge, P. W., Smithsonian Institution, Smithsonian Contributions to Astrophysics, vol. 4, No. 10, pp. 145-152, 1961.
"The Space Density of Atmospheric Dust in the Altitude Range 50,000 to 90,000 Feet", Hodge, P. W. et al, Smithsonian Institution, Smithsonian Contributions to Astrophysics, vol. 5, No. 14, pp. 231-238, 1962.
"Vertical Distribution of Dust in the Stratosphere", Rosen, J. M. et al, Smithsonian Institution, Symposium on Meteor Orbits and Dust, pp. 345-347, 1967.
"Cirrus Clouds and Climate", Reprint from the McGraw-Hill Yearbook of Science & Technology 2005, http://cires.colorado.edu/Science/groups/pielke/Classes/afoc7500/Cirrus_Properties.pdf/.
CAUPSO Laser Depolarization From Around the Globe: Improved Understanding of Ice Cloud Properties and Relation to Deep Convection, Sassen, K. et al, Geophysical Institute, University of Alaska Fairbanks, http://gewex.org/2009_Conf_Gewex_oral_presentations/Sassen_G11.pdf.
"A Method for Numerically Calculating the Area and Distribution of Water Impingement on the Leading Edge of an Airfoil in a Cloud", Bergrun, N. R., NACA Technical Note 1397, 1947.
"Electrical Properties of LPCVD Polysilicon Deposited in The Vicinity of Amorphous-Polycrystalline Phase", Tomozeiu, N. et al, Journal of Optoelectronics and Advanced Materials, vol. 2, No. 5, 2000, pp. 657-663.
Abstract entitled "Electrical Conductivity Behavior of Thin In Situ Phosphorous Doped VLPCVD Polysilicon Films", Journal of Materials, Chemistry and Physics, Meeting on the Science Materials, vol. 33, n° 1-2, 1993, pp. 145-149.

\* cited by examiner

*Primary Examiner* — Stephen W Jackson

(57) ABSTRACT

An Extra Electric Energy System that supplies electrical power to an aircraft of the continuous flight duration day/night cycle solar powered type is described where the extra electric energy is generated as static charge by collisions of the aircraft with particles existing in the earth's atmosphere. The manner in which the static charge is collected, stored and used immediately to meet present or future aircraft power needs is considered. An example of the application of the system to a high altitude solar powered Helios type aircraft is offered along with a discussion of how its structure is modified to store static charge.

14 Claims, 11 Drawing Sheets

EXTRA ELECTRIC ENERGY FOR DAY-NIGHT CYCLE SOLAR AIRCRAFT

COPYRIGHT NOTICE

A portion of the disclosure of this patent document contains material that is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The invention relates to the field of energy and in particular to the production of extra energy on a solar photovoltaic (PV) powered aircraft that is designed to fly indefinitely thru continuous day-night cycles. The extra energy that is produced eases the design constraints on present solar powered aircraft designs being formulated by providing an additional and previously unrecognized source of energy that may be tapped during periods of continuous flight. The energy source is the electric charge that is generated on the aircraft when the aircraft and its solar cell array collide with atmospheric particles; static charge produced by a phenomena known as the P-Static effect. The energy is collected, used directly and/or stored in a number of different ways for later use including: within the aircraft's structure modified to act as capacitors, within capacitors located in the fuselage and/or wing volume of the solar aircraft, in batteries carried by the aircraft or through the making of consumables during the day for use in an onboard regenerative fuel cell which are then stored and used at night by the onboard fuel cell to produce electric energy.

BACKGROUND OF INVENTION

Developments in technology have brought the concept of a solar powered aircraft that flies continuously through day/night cycles unassisted for durations of months or years to a point where it now may be considered as something that may be possible in the time frame of the next few years or at least in the next decade.

To achieve the goal of continuous solar powered flight requires that additional improvements be made in a number of related technologies including more efficient and lighter weight solar photovoltaic (PV) arrays, improved means to capture the largest amount of incident solar energy, improvements in the aerodynamic efficiency of the aircraft to reduce electrical power requirements to propel the aircraft, improvements in the aircraft's propulsion system and means for producing thrust, reductions in the weight of the aircraft through the use of improved materials of greater strength while being lighter and while maintaining reasonable structural factors of safety, improved methods of storing the solar energy after direct conversion to electricity by the solar PV cells and higher efficiency methods for removing energy from storage and converting it to useful electrical power.

Presently, technology is being developed along a number of different paths that may converge for use in such a continuous duration solar powered aircraft. For example at the present time, non-concentrating silicon solar arrays which gather solar radiation on a single side are available that operate at up to 24 percent efficiency but to be used for continuous solar powered flight, they still need to be lighter in weight and lower in cost. There are non-concentrating, bifacial silicon solar arrays that accept solar radiation incident on both sides with different electrical conversion efficiencies: presently twenty one percent on the primary surface and fourteen percent on the secondary surface. Again, the bifacial PV cells need to be lighter in weight and higher in electrical conversion efficiency to make continuous solar powered flight feasible.

A solar powered aircraft capable of continuous day/night flight must possess a means to power itself during night periods when solar energy is not available. To accomplish flight during periods of darkness, the aircraft must utilize energy that has been stored during the daytime. Means that are being pursued to store energy include batteries, solar thermal approaches with thermal batteries powering a Stirling engine, solar thermal approaches with a thermal battery powering a Rankine-Brayton engine and closed loop regenerative fuel cells typically powered by hydrogen and oxygen with an electrolyzer producing hydrogen and oxygen from on-board water captured as waste from the fuel cell. For batteries, lithium polymer and lithium-ion batteries appear most promising at this time. With regard to closed loop regenerative fuel cells, an approach that separates an onboard supply of water into hydrogen and oxygen gases during the day using solar energy and stores the gases for later use at night appears to be a most promising approach at this time. At night when electrical power is needed, the hydrogen and oxygen gases are recombined by passing them through a fuel cell to produce electricity with the recombination in the fuel cell producing water for reuse during the next solar day. All of the storage approaches including batteries, solar thermal batteries or closed loop hydrogen-oxygen fuel cells still need substantial development before they would qualify for use in a solar powered aircraft with continuous endurance.

Some other past programs have developed technology that appears attractive for use in a continuous duration solar powered aircraft but substantial improvements need to be incorporated in what is presently available or what has presently been accomplished. But, none of the prior programs has come at all close to what is needed. Present technology is at its infancy in regards to a continuous duration solar powered aircraft.

Recently, one of the more promising programs is the unmanned solar powered Helios aircraft program carried out by AeroVironment Inc. and funded by NASA whose goals were to demonstrate sustained flight at an altitude near 100,000 feet (30.5 km) and to fly non-stop for at least 24 hours, including at least 14 hours above 50,000 feet (15.2 km). The Helios aircraft, in the high altitude version configuration HP01, achieved the first goal in 2001 by reaching an official world-record altitude of 96,683 feet (29.5 km) and sustained flight above 96,000 feet (29.2 km) for more than 40 minutes Unfortunately, the solar powered, flying wing Helios aircraft, in the long flight duration HP03 configuration which was to fly at 50,000 foot (15.2 km) altitude, disintegrated in flight on Jun. 26, 2003 when it suffered a structural failure at an outboard wing location at 2800 feet (0.85 km) altitude just after takeoff; the structural failure attributed to the aircraft flying through wind shear which produced atmospheric turbulence.

It is worthwhile considering the Helios aircraft in more detail for it demonstrated several features that a continuous duration solar powered aircraft might utilize if improved further: bifacial solar cells that accept solar radiation incident on both sides and the use of space age materials to construct a lightweight structure.

The Helios aircraft was an ultra-lightweight flying wing aircraft with a wing span of 247 feet, a gross weight of 1600 pounds and a wing of 8 foot chord and 12 percent airfoil thickness; the upper surface of the wing covered with 62,000

SunPower Inc. bifacial silicon solar cells and the lower surface of the wing covered with a transparent plastic surface to allow solar energy to be incident on the bifacial solar cells from below. The Helios aircraft, configuration HP01, was powered by 14 brushless DC electric motors, 2 HP (1.5 kW) each and configuration HP03 by 10 brushless DC electric motors also 2 HP (1.5 kW) each, distributed along its leading edge and the aircraft was constructed mostly from composite space age materials including carbon fibers, graphite epoxy, Kevlar, and styrofoam; with the styrofoam shaped to form the wing's leading edge and the entire wing wrapped with a thin, transparent plastic skin. Structurally, a large diameter, reinforced carbon fiber hollow tube, located just behind the styrofoam leading edge and running from wing tip to wing tip, carried a majority of the flight loads; along with the wing's ribs and a smaller structural tube member located near the trailing edge of the wing, also running from wing tip to wing tip.

Another recent and promising unmanned solar powered aircraft is the Qinetiq Zephry unmanned air vehicle which is hand launched and has as a goal the carriage of a small communications payload above 40,000 feet (12.2 km) for a two week period. In July 2008, it flew a test flight of 82 hours and 37 minutes duration with a portion of the flight as high as 60,000 feet (18.3 km) while carrying a communication relay payload of 4.4 pounds. The Zephry aircraft has a wing span of about 60 feet, weighs about 66 pounds and has a structure constructed of carbon fibers with amorphous silicon solar cells covering the aircraft's wing. By day it flies on solar power generated by part of the solar array and at night it is powered by rechargeable lithium-sulphur batteries that are recharged during the day using the remaining solar power.

In April 2008, the Defense Research Projects Agency (DARPA) of the U.S. Government instituted Project Vulture by selecting Aurora Flight Sciences, Boeing and Lockheed Martin as contractors for the first phase of a program to develop an unmanned air vehicle able to fly on station at an altitude of 65,000 feet (19.8 km) or higher and perform its mission for five years without interruption. The ultimate goal of the Vulture program is to develop a system capable of carrying a 1,000 pound payload drawing five kW of power with the air vehicle remaining in the required mission airspace 99 percent of the time. During Phase 1, an analytical effort was carried out by the three contractors who conducted trade studies to determine the design concept that best satisfied the operational tasks and optimized the design capabilities. Phase 2 is to be a risk development and testing phase (2009-mid 2012) with Phase 3 to follow in which a full scale aircraft demonstrator capable of staying up for 12 months is to be fabricated.

During the Phase 1 studies, Aurora Flight Science was known to be considering a solar powered unmanned aircraft of unique shape, like a "Z" letter, of modular design where the full size vehicle is assembled in flight by modules that attach to each other; the "Z" shape to be adjustable in flight to maximize solar collection and energy stored in onboard batteries to be used at night. Boeing chose to work with Qinetiq and was expected to use the expertise garnered by Qinetiq in developing technologies for its high-altitude, long endurance solar vehicle, the Zephyr. The plans of Lockheed Martin regarding their proposal were not made public.

Though it is known that Phase 1 was completed by late spring 2009 by all three contractors and that Aurora Flight Science was subsequently dropped from participation in Phase 2, little additional public information has been released regarding the results of the trade studies, about the most promising aircraft configurations or about the most promising energy storage methods.

In the realm of manned solar powered aircraft, the Solar Impulse prototype aircraft, HB-SI-A, was unveiled in Switzerland on Jun. 26, 2009. It weighs 3527 pounds and is intended to demonstrate the ability of a single pilot, manned aircraft to remain aloft for a complete day-night-day cycle. The Solar Impulse prototype is limited to operation at altitudes below 28,000 feet (8.5 km) because it does not have a pressurized cockpit. Its wing span measures about 210 feet and its wing has a chord profile thickness of 17%. It is powered by four 10 HP electric motors with electricity provided by 11,628 solar cells; 10,748 on the wing and 880 on the horizontal stabilizer. During the day, the solar array is used to charge lithium-polymer batteries to enable nighttime operation. Its first test flight is expected in late 2009.

There are two additional non-solar powered aircraft projects that are worth mentioning that have established the present state of the art in fuel cell powered unmanned and manned aircraft. The first is the unmanned, non-regenerative, hydrogen fuel cell powered air vehicle designated the Ion Tiger aircraft, a research program of the U.S. Naval Research Laboratory, which has the goal of staying in the air for 24 hours with a payload of 5 pounds. The Ion Tiger air vehicle is relatively small with a wing span of approximately 20 feet and is powered by a 500 watt fuel cell that relies on technology developed by the automotive industry. The second non-solar aircraft is a manned vehicle employing a 25 kW hydrogen fuel cell for power, the motor assisted glider, Antares DRL-H2, under development by the German Aerospace Center (DRL) and flown for a 10 minute flight in July 2009. The opinion expressed in an article regarding this fuel cell powered aircraft is "don't expect fuel-cell-based jetliners any time soon: actually, the most likely ETA (estimated time of arrival) for such aircraft is never, since fuel cells have a power-to-weight ratio that makes large planes impractical".

In summary, the technology that is currently available for use in future continuous duration, high altitude, unmanned solar aircraft capable of carrying a payload of 1000 pounds is meager at best. On the one hand, major improvements are required in the materials used to construct such vehicles, in the structural analysis methods used to design them and in developing a better understanding of the loads that they will experience in flight so they don't disintegrate in flight like the Helios vehicle. Major improvements are also needed with regards to the solar arrays that are used on these vehicles; particularly in the need for higher solar conversion efficiencies for the arrays while also reducing the weight per unit area of the array and major efficiency improvements are required in the area of electrical energy storage and for the recovery of energy from storage.

Proposed regenerative electrical power systems utilizing closed loop, hydrogen and oxygen fueled fuel cells with an onboard electrolyzer for replenishment of the hydrogen and oxygen gases using solar energy during the day appear to be paper designs at this time requiring substantial development particularly in the area of energy production per unit weight of the fuel cell. Future development of a continuous duration solar powered unmanned aircraft depends on achieving a variety of incremental improvements in each of a variety of technological areas all related to each other in the design of the aircraft; for instance, a solar array with a higher efficiency means a lighter weight aircraft requiring a reduced wing area and lower electrical power requirements for propulsion.

Any means to increase the effectiveness of the electrical energy production on a continuous duration solar powered aircraft, no matter how small an improvement, is reflected immediately in the aircraft's design either in its size or performance. Increased effectiveness of electrical energy production, especially if that increase in effectiveness is realized with little weight gain, is especially valuable to speed the availability of such an aircraft.

It has now been discovered that the present invention does just that: it provides extra electricity with little associated weight addition by incorporating minor changes in existing features of such an aircraft for the production, collection and storage of the extra electricity. The extra energy is realized from the fact that static charge is continuously formed on parts of the aircraft when the aircraft collides with particles in the earth's atmosphere whether the surface material is metal or a dielectric material. Particles in the earth's atmosphere include, but are not limited to, dust, fog, rain, sleet, snow, ice and volcanic ash particles. In this patent application, the word particle shall include all the preceding particle variants as well as all other types of particles that may be present.

The difference between static charge forming on a metal surface or on a dielectric one is that on a metal surface the charge migrates easily and forms an equipotential surface while on a dielectric surface the charge remains where it is formed because of the low electrical conductivity of the dielectric. The collection of static charge being generated on the dielectric surface is collected in the present invention thru the addition of electrodes to the surface and/or by coating the surface with conducting material that facilitates the migration of the charge to the collecting electrodes. The present invention collects this static charge and uses it to meet immediate aircraft power needs or stores it for future use at night. The extra electrical power produced by the present invention lowers the amount that must be provided by the aircraft's principal source of electrical power generation thus making it easier to create the aircraft. Aspects of the present invention are now described.

A patent search was conducted to identify prior art for cases where static charge is utilized for any useful purpose on an aircraft or in particular, on a continuous duration solar powered aircraft, the subject of the present application. The only prior patent that was found for the useful use of static charge on an aircraft was U.S. Pat. No. 7,592,783 issued on Sep. 22, 2009 to Philip Jarvinen who also is the inventor for the present application. U.S. Pat. No. 7,592,783 is for a P-Static Electrical Power System for an Aircraft that produces electrical energy from collisions of the aircraft with dust, rain, sleet, snow and ice particles. All other prior art that was found was for the elimination of static charge forming on an aircraft because static charge was considered a bad and bothersome phenomena and something to rid the aircraft of as quickly as possible because of its deleterious effects on aircraft communication and navigation systems.

No prior art was found that had any bearing on the present invention for static charge collection and its use on a continuous duration, day/night cycle solar powered aircraft. No prior art was found for the generation and use of static charge formed on an aircraft by the collision of the aircraft with particles in the earth's atmosphere which is the subject of the present application. No prior art was found regarding the use of structural elements of a solar powered aircraft for the storage of static charge which is the subject of the present application. No prior art was found for designing the propeller blades of a continuous duration solar powered aircraft with composite materials to generate static charge thru collision with atmospheric particles as is done in the present invention or for providing electrodes on the surface of the propeller blades to bleed the static charge to the propeller drive shaft and thence to a static charge storage device which is the subject of the present invention.

SUMMARY OF THE INVENTION

The present invention captures static charge that forms on the external surfaces of an aircraft due to collisions of the aircraft with particles that exist in the earth's atmosphere; particles that exist particularly at the altitudes that continuous duration day/night cycle solar powered aircraft are expected to fly; near 50,000 feet (15.2 km). This is a source of electrical power that has been overlooked up to the present time in the design of such day/night cycle solar powered aircraft and is shown in the present invention to be easy to capture through minor design changes in such an aircraft. The amount of electrical power produced by the present invention represents a valuable fraction of that provided by the solar powered aircraft's primary electrical system since the present invention provides the electrical power in a continuous stream both day and night with only a small incremental weight addition to the aircraft. Capture of this presently unused source of energy reduces the number of incremental improvements that need to be made in other primary systems of the solar powered aircraft before the goal of continuous day/night flight duration is achieved. The method of electric energy production discussed herein for a day/night solar powered aircraft is also usable for the same purpose on any aircraft, airship or lighter-than-air vehicle flying in the earth's atmosphere or in the atmosphere of the planet Mars.

Prior investigations of dust in the universe have established that about 40,000 tons of dust particles fall to earth each year which originate from "space leftovers", mostly from disintegrating comets and asteroid collisions with the earth's atmosphere with some of that dust residing continuously in the earth's atmosphere. Dust collection missions were flown by a B-52 aircraft at altitudes near 40,000 feet (12.2 km); by a U-2 aircraft at unspecified altitudes and by an F-104 aircraft in the altitude range from 51,000-87,000 feet (15.5-26.5 km) as part of the Smithsonian interstellar dust identification program[1,2]. These flights established the continuous presence of dust in the tropospheric and stratospheric regions of the earth's atmosphere. Experimental measurements of the distribution of dust in the atmosphere have also been conducted using balloon-borne photoelectric particle counters. These measurements[3] established the vertical distribution of atmospheric dust in the earth's atmosphere and demonstrated the existence of dust up to altitudes near 90,000 feet (27.4 km) as well as establishing increasing amounts of dust at lower altitudes down to a peak amount at about 35,000 feet (10.7 km). Another somewhat larger peak was found to occur at altitudes below 10,000 feet (3.0 km). Thus, dust continuously fills the atmosphere at altitudes where a continuous duration solar powered aircraft may possibly operate. It is also well known that collisions between dust particles in a dust devil and in dust storms on the earth's surface produce static charge as well as collisions between dust particles and an aircraft operating in the earth's atmosphere; the latter action the subject of the present invention.

Ice particles are also present in large quantities in the earth's atmosphere in the form of clouds at and about the 50,000 foot (15.2 km) altitude where a continuous duration solar powered aircraft may operate. In particular, high altitude Cirrus clouds[4], which are ice particle formations, are located near the top of the troposphere; typically at or 1.5 km's above the top. The presence of ice particles in the upper troposphere has drawn much attention and study because ice particles play an important role in the earth's atmospheric radiative balance. Experimental measurements of Cirrus cloud heights have been made from high flying aircraft and from satellites circling the earth. A particularly informative set of measurements[5] for the height of Cirrus ice particle clouds was made by NASA's A-Train satellites: CloudSat and CALIPSO where CloudSat employed a 94 GHz (3.2 mm) Cloud Profiling Radar and CALIPSO employed cloud profiling backscattered laser light using a dual band Lidar operating at 1.06 and 0.532 microns wavelength. The heights of the ice clouds were determined from the Radar and Lidar data as a function of earth's latitude and as a function of the season of the year. This data showed that the maximum height of ice particles between −30 degrees and +30 degrees latitude is typically 18 km's with the height lowering to about 11-12 km's at −80 degrees and +80 degrees latitude near the poles. The data also showed somewhat larger amounts of ice particles at a given height and at a given latitude at nighttime in comparison to daytime amounts. It is well known that collision of an aircraft with ice particles will also charge the aircraft thru the P-Static effect. Other data (not shown) on ice particle size finds that ice particle diameters are substantially larger than that of dust particles in the upper troposphere with ice particles having diameters ranging from about 20 microns to over 600 microns.

Therefore, a continuous duration solar powered aircraft operating near 50,000 foot (15.2 km) altitude will collide with and be charged by collisions with dust particles as well as with ice particles with the collisions with ice particles producing substantially greater amounts of static charge due to their larger size than collisions with dust particles. On occasion in the equatorial region, the aircraft may also collide with regular and supercooled rain drops due to the severe upwelling of Cumulonimbus clouds. The number of collisions that may occur may also depend on the philosophy of flight that is employed: is the aircraft always flown at a constant altitude both in daytime and at night or is the aircraft allowed to descend and/or glide somewhat during the night and regain the lost altitude during the day when the solar input is the greatest?

The present invention collects static charge that is formed at various locations on the aircraft due to collision with particles in the atmosphere. Areas on the aircraft's external surfaces where collisions with particles occur and static charge is formed include the wing leading edge, any forward facing surface or surface bulge which collides with the particles, rotating propeller blades which strike the particles, the wing's upper and lower surface areas directly behind the propellers where airflow set in rotation by the propellers and containing particles strikes on the upper wing surface against the solar array and on the lower wing surface against the wing surface itself and the lower wing surface by direct strikes of particles from the free stream flow.

Most materials being considered for use as external surfaces for solar powered aircraft have one property in common: the need to be thin and lightweight which leads to the use of dielectric plastic film for surfaces. In the case of a solar powered aircraft having a leading edge made with styrofoam as done in the Helios aircraft, styrofoam has a dielectric constant, which like that of Teflon, readily produces static charge when impinged upon by particles. Any static charge produced on the surface of styrofoam remains at the location where it is produced because of styrofoam's low electric conductivity. To collect static charge formed on the styrofoam leading edge, the present invention applies a thin, lightweight, open metal mesh or equivalent set of electrodes to the surface of the styrofoam which collects the static charge and conducts it to charge storage devices under the direction of a system controller that monitors the state of charge in each static charge storage device and selects the most appropriate charge storage device.

Propellers, if used to propel the continuous duration solar powered aircraft, are ones where the propellers of the present invention are constructed from composite materials so as to produce static charge on themselves when they strike particles in the atmosphere. In the present invention, the outer surfaces of the composite propellers are covered with electrically conductive electrodes or equivalent which gather the static charge and direct the static charge to migrate to the metal propeller drive shaft or to a metallic layer placed on the surface of a propeller shaft if made of composite material. The static charge then moves along the shaft to a downstream location where the static charge is wiped from the shaft and conducted to a charge storage device. Since the propellers operate continuously day and night with high subsonic tip speeds at times, the composite propellers produce substantial amounts of electrical charge to be collected and used or stored.

The propellers also induce rotational flow (swirl) in the airflow containing the particles causing some of the particles in the swirling flow to strike the upper wing surface on which the solar array is mounted and produce static charge there and some to strike the lower wing surface and also produce static charge there. The solar array, if fabricated with standard silicon solar cells, will usually have a solar cell array surface covered on its outer surface with a thin outer passivation coating of silicon oxide. The silicon oxide coating, when struck by a particle, produces static charge but because of its poor electrical conductivity, the static charge remains in place at the position where it is formed. In the present invention, the solar array electrodes, that are used in daylight to collect the charge produced by the action of solar radiation incident on the solar cell, are used to collect any static charge formed on the outer surface of the solar array on the wing's upper surface due to strikes by particles accelerated by the action of the propeller or due to direct strikes from the free stream.

To facilitate the collection of static charge on the solar cells, the present invention modifies the construction of the standard solar cell, usually a silicon cell coated with a silicon oxide outer passivation layer, by adding a thin, additional coating to the external surface of the standard cell to increase the electrical conductivity of the cell's surface. With a new thin layer of material with higher electrical conductivity as the cell's outer surface, the static charges migrate to the existing metal electrodes of the array and thence are carried to a static charge storage device. In the present invention, the new, thin exterior coating that is added is a coating, for example, of higher electrical conductivity polycrystalline-silicon hereafter referred to as polysilicon or its equivalent added on top of the silicon oxide layer. The new layer does not effect the operation of the solar cells in the daytime but provides the higher electrical conductivity needed for external surface static charge migration.

In regions of the lower wing surface, outside the direct influence of airflow induced by the propellers, particles make direct collisions with the wing's lower surface producing static charge on that surface. On the Helios aircraft, its entire wing is wrapped with a thin transparent plastic skin. The plastic skin on the lower wing surface allows solar radiation to reach the active backside of the bifacial solar cells forming the solar array. The static charge of the present invention which is produced continuously on the lower wing surface both day and night is collected and used directly or stored for later use. Collection of static charge on the lower wing surface in the present invention is accomplished using metal electrodes or their equivalent added to the lower wing surface or by utilizing an electrically conductive lower wing surface or coating on the surface. In either case, the use of electrodes or electrically conductive material, the static charge is carried away for direct use or for storage in static charge storage devices.

The static charge produced at various locations on the aircraft is stored in the present invention within the aircraft's free volume or within the aircraft's structure itself for future use. In a continuous duration solar powered aircraft, if near the size of the Helios aircraft with a wing of 8 foot chord and 247 feet span tip to tip and with airfoil thickness of 12 percent of the chord, there is sufficient volume within the wing for static charge storage devices. Even the aircraft's structure may be modified and utilized for static charge storage as discussed below.

For instance if the wing structure of the continuous duration solar powered aircraft is of a design like that of Helios and employs a large, hollow carbon filament tube running from wing tip to wing tip as a major structural entity, the present invention, recognizing that the carbon fiber tube is an electrical conductor, transforms the carbon fiber tube into a cylindrical capacitor using the carbon fiber tube as one of the electrodes of the capacitor. The second electrode of the cylindrical capacitor is then added in the present invention, for example, by inserting a metallic or carbon fiber electrical conductor in the center of the first carbon fiber tube or by overwrapping the first carbon tube with an electrically insulating wrap followed by a second metallic wrap or carbon fiber wrap to form the second electrode. One large capacitor is created if the electrodes run the full length of the tube from wing tip to wing tip or several shorter capacitors are created if the length of the tube is divided up into shorter capacitor lengths; one capacitor length per wing panel for the six panels of a Helios type aircraft. The use of several shorter capacitors provides a flexibility for storing the static charge at different maximum voltages.

Assuming the continuous duration solar powered aircraft employs a wing structural tube like that used in Helios and assuming that the tube just fits inside the airfoil as it did in Helios and has a maximum diameter of 11.5", such a tube running from wing tip to wing tip provides a total surface area near 500 square feet or greater for conversion into a single capacitor energy storage device or into several capacitor energy storage devices. The present invention also includes modifying any other single wall or coaxial hollow tube in the aircraft made of electrically conducting material, for example forming a wing rib or other structure, into a cylindrical capacitor storage device by the techniques outlined above for transforming the main tubular aircraft structure.

For lower voltage static charge storage, the present invention includes placing low voltage capacitor energy storage devices in the wing's free volume between wing ribs or between the ends of the six wing panels if the wing is constructed like that of the Helios aircraft. This is easier to implement if single sided solar cells are utilized rather than bifacial ones for the storage capacitor must not interfere with the solar radiation incident on the backside of the bifacial solar cells. Static charge storage is accomplished in the present invention for single sided solar cells where the solar energy incident on their backsides may be blocked without detriment by stretching two or more physically separated and horizontally arranged metalized thin sheets within the hollow wing between wing ribs or ends of a wing module to form each face sheet of a capacitor. Metalized Kevlar cloth or its equivalent is a possible material to be used for the flat sheets with Kevlar's inherent strength used to support the attractive loads generated by the oppositely charged capacitor faces. For bifacial solar cells, fixed metalized sheets are placed in vertical or near vertical locations in the free volume so that solar radiation remains incident on the backside of the bifacial cells. In another configuration of the present invention, the vertical metalized sheets are rotated about their upper ends to avoid any shadowing of the solar cells while also maximizing the amount of incident solar energy falling on the backside of the bifacial solar cells. If the aircraft employs I-beams as structural members, the I-beams are converted into energy storage capacitors by placing facing electrodes on the top and bottom webs of the I beam.

It is therefore an objective of the present invention to generate extra electrical power on a continuous endurance solar powered aircraft or its equivalent by collecting static charge that occurs on its external surfaces by the collision of the aircraft with particles that reside in the earth's atmosphere.

It is a further objective of the present invention to incorporate design changes in the solar powered aircraft, such as the use of dielectric materials that readily produce static charge, that facilitate the production of static charge on the aircraft.

It is a further objective of the present invention that one source of static charge that is to be collected and made available for immediate use or for storage is the static charge formed on the leading edge of the wing due to collision with particles; the material for the leading edge of the wing being chosen to have a value of dielectric constant fostering the development of static charge such as styrofoam.

It is a further objective of the present invention that the static charge on the leading edge of the wing, produced by impact with particles, be collected by adding a thin, open, lightweight metal mesh or equivalent set of electrodes to the outer surface of the leading edge with the mesh or the electrodes connected in turn to static charge storage devices.

It is a further objective of the present invention that the propellers used to power the continuous duration solar powered aircraft vehicle thru the atmosphere be fabricatedIrom composite material that will generate static charge on themselves when they come in contact with particles residing in the atmosphere and that the composite propeller blades have on their surface a set of electrodes or equivalent that collects the static charge and carries the static charge to the propeller drive shaft.

It is a further objective of the present invention that the propeller shaft be constructed of metal or of composite material with a set of longitudinal electrodes or equivalent running down the exterior of the propeller shaft to carry static charge away from the propeller blades and that the charge running down the exterior of the propeller shaft be wiped from the shaft by a set of metallic whiskers or equivalent placed around the shaft and in close proximity to the shaft with the static charge so collected connected electrically to a static charge storage device where it is stored or to aircraft components that use the static charge directly after proper power conditioning.

It is a further objective of the present invention that static charge produced by particles that are caused to collide with the aircraft wing downstream of the propeller disk due to the action of the propeller including the swirl induced by the propeller be collected and stored for later use or used immediately to power aircraft components after proper power conditioning.

It is a further objective of the present invention that static charge produced on the solar array, which covers the entire upper surface of the wing, be collected using the existing solar cell metallic electrodes and carried to a static charge storage device for storage or carried to aircraft components requiring a supply of immediate electrical power.

It is a further objective of the present invention that enhanced mobility of the static charge formed on the solar cell array on the upper wing surface be achieved in order to carry the charge to the surrounding solar cell metallic electrodes by coating the solar cell array's outer surface with an electrical conducting material such as polysilicon or its equivalent to foster charge migration.

It is a further objective of the present invention that the static charge produced by particles making direct collisions with the lower wing surface from the free stream be collected by adding metallic electrodes or their equivalent to the lower wing surface if dielectric material or thru the use of an electrically conductive wing surface material or equivalent electrically conducting coating on the wing's lower surface with the electrodes or electrically conductive material attached to static charge storage devices.

It is a further objective of the present invention that the structure of the solar powered aircraft be designed to facilitate the storage of static charge on or within the structure.

It is a further objective of the present invention that if a large, open carbon fiber or electrically conducting tubular structure is used in the continuous duration solar powered aircraft, similar to that used in the present Helios aircraft design as a primary load carrying structure in the wing, that the tubular structure be equipped with electrodes in or on its surfaces and used as a single capacitor or multiple tube segments used as several physically separated capacitors for the storage of static charge.

It is a further objective of the present invention that the design of other load carrying structures in the aircraft's wing or body in the shape of smaller single tubes, coaxial tubes or I-beams be coated with suitable electrodes to form capacitors for the storage of static charge.

It is a further objective of the present invention that sheet like capacitors, formed for example from metalize Kevlar cloth material, be mounted in the free volume of the aircraft's wing and used to store static charge.

It is a further objective of the present invention that the Extra Electric Energy System which is based on the collection of static charge be provided with a system controller that monitors system operation, the state of charging by individual contributors and the state of charge in each static charge storage device and selects the most appropriate storage unit to direct newly collected static charge to.

It is a further objective of the present invention that power conditioning equipment be provided as part of the Extra Electric Energy System which is based on the collection of static charge and used to condition the collected electrical energy to the voltage level and type of power, DC or AC, required by components of the continuous duration solar powered aircraft.

The features and advantages described herein are not all inclusive and, in particular, many additional features and advantages will be apparent to one of ordinary skill in the art in view of the drawings, specifications and claims. Moreover, it should be noted that the language used in the specifications has been principally selected for readability and instructional purposes, and not to limit the scope of the inventive subject matter.

FIG. 8 is a side view drawing of the present invention illustrating how the propeller/electric motor combination used on the Helios HP01 and HP03 solar powered aircraft is cantilevered forward from the aircraft's wing.

FIG. 9 is a cross-sectional view of the present invention through the wing of a continuous duration solar powered aircraft of the Helios HP01 type flying at angle of attack and illustrating direct collisions of particles in the free stream flow with the lower wing surface.

FIG. 10 is a cross-sectional view of the present invention thru the main structural tubular member of the wing of a continuous duration solar powered aircraft of the Helios HP01 type illustrating the transformation of the main structural tube into a cylindrical capacitor by the addition of a centrally located electrically conducting member.

FIG. 11 is a drawing of a cross-sectional view of the present invention thru the main structural tubular member of the wing of a continuous duration solar powered aircraft of the Helios HP01 type illustrating the transformation of the main structural tube into a cylindrical capacitor by the addition of an insulator overwrap followed by a second overwrap of electrically conducting material to form the second electrode, FIG. 12 is a planform drawing of the present invention of the area between two wing ribs of a continuous duration solar powered aircraft of the Helios HP01 type illustrating the addition of a horizontal, multiple electrode, flat sheet type capacitor.

FIG. 13 is a drawing of a cross-sectional view of the present invention thru the wing of a continuous duration solar powered aircraft of the Helios HP01 type illustrating the addition of two horizontal, flat sheet type capacitor electrodes within the wing's volume.

FIG. 14 is a drawing of a cross-sectional view of the present invention thru the wing of a continuous duration solar powered aircraft of the Helios HP01 type illustrating the addition of vertical, fixed and/or rotatable, flat sheet type capacitor electrodes within the wing's volume.

FIG. 15 is a block diagram of the Extra Electric Energy System of the present invention for a continuous duration solar powered aircraft of the Helios HP01 type.

DETAILED DESCRIPTION

The present invention is for an Extra Electric Energy System for a continuous duration day/night cycle solar powered aircraft which creates the extra electric energy by collecting static charge that forms on the external surfaces of such a vehicle and which uses the energy directly to power aircraft components or stores it in static charge storage devices for later use at night.

The collisions between particles and an aircraft appear differently depending on the reference system chosen for the viewing observer. For the observer located in an inertial reference system, the particles are non-moving and the aircraft is seen to be moving. For the observer located in an aircraft fixed reference system, the particles are seen to be moving with respect to the fixed aircraft. However, the creation of static charge and other events occurring in both reference systems are the same whether observing from an inertial fixed reference system or from an aircraft fixed reference system. Sometimes it is easier to visualize certain things when viewed from one reference frame rather than the other. In the discussions that follow, the discussion may move from one reference frame to the other under the knowledge that the event or action being described as happening in one reference frame relates directly to what is happening in the other.

Figure 1:
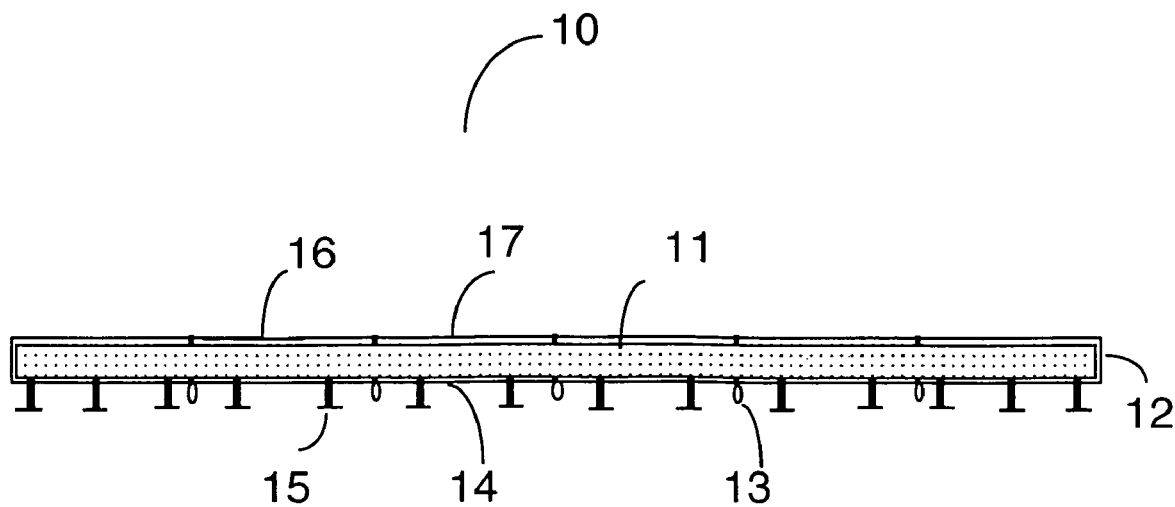
FIG. 1 is a drawing of the planform of the prior art Helios HP01 high altitude solar powered aircraft equipped with 14 electric motors along the leading edge of the wing.

Also in the following discussions, the solar powered Helios aircraft, though not yet in the class of a continuous duration solar powered aircraft of the present invention, is taken, for purposes of discussion, as a close example of an aircraft incorporating some of the features of the future continuous duration solar powered aircraft. This is being done since the Helios aircraft flies at flight conditions of velocity and altitude anticipated to be close to those for a future continuous duration solar powered aircraft and it incorporates structural design features that might also be used in the future generation aircraft of the continuous duration type. FIG. 1 illustrates the planform of the prior art Helios solar powered aircraft in its HP01 high altitude configuration. The prior art HP01 aircraft consists of a flying wing of rectangular shape without fuselage with a wing span of 247 feet and a wing chord 12, the distance from the leading edge 14 to the trailing edge 16, of 8 feet. The wing is assembled in six panel sections 17, each about 41 feet long. An underwing avionics pod 13 is attached at each panel joint for a total of five underwing avionic pods. The underwing avionics pods carry landing gear, battery power system, flight control computers and data instrumentation. The prior art HP01 high altitude configuration is powered by fourteen electric motors of 1.5 kW each driving two bladed propellers 15 with its upper wing surface covered close to entirety with a solar cell array 11 and its lower wing surface formed with thin, transparent plastic material.

Figure 2:
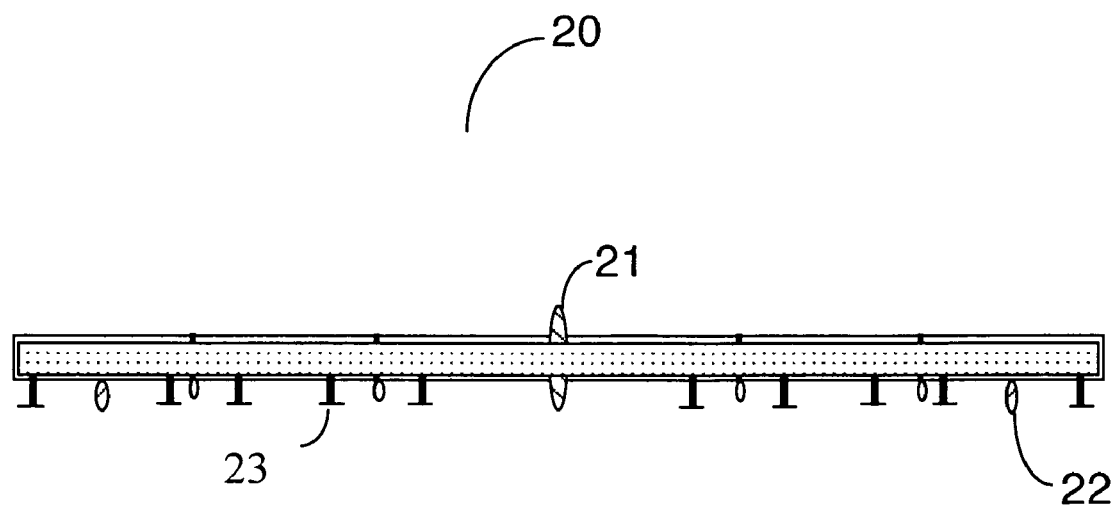
FIG. 2 is a drawing of the planform of the prior art Helios HP03 long endurance version solar powered aircraft equipped with 10 electric motors.
Figure 3:
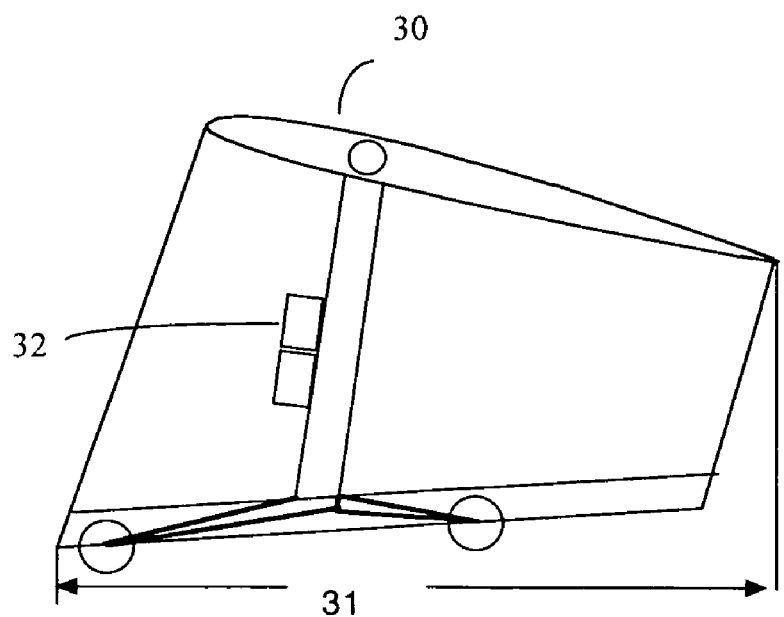
FIG. 3 is a drawing of a side view of the below wing avionics pod carried at five places on the prior art Helios HP01 high altitude solar powered aircraft.
Figure 4:
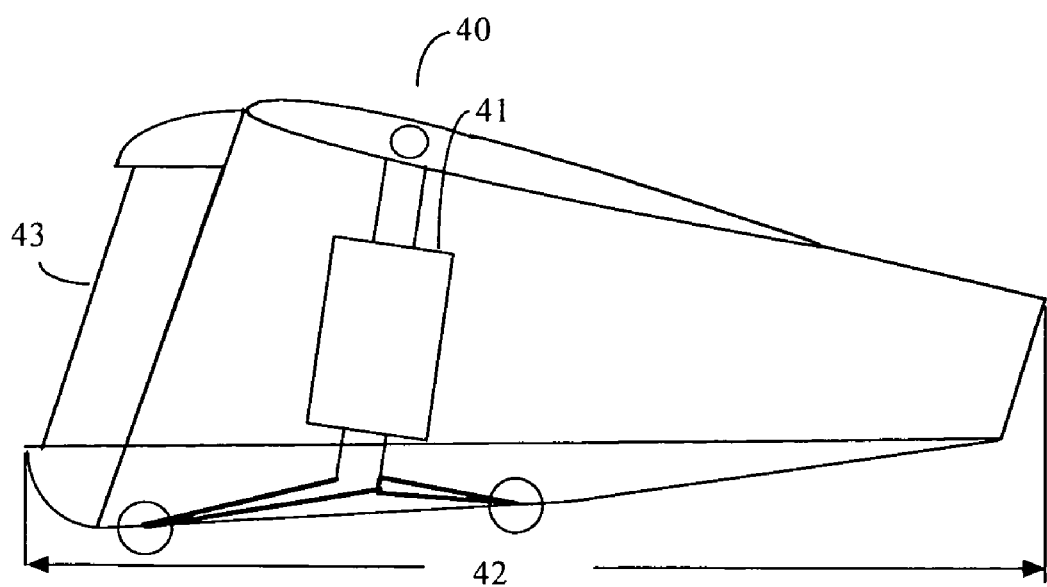
FIG. 4 is a drawing of a side view of the centerline mounted, below wing hydrogen/air fuel cell pod carried on the prior art Helios HP03 long endurance solar powered aircraft.

The prior art HP03 long duration configuration which is to fly near 50,000 feet (15.2 km) is illustrated in FIG. 2 and has the same rectangular wing profile, wing span and wing chord as the HP01 configuration but is powered by ten electric motors driving propellers 13. An enlarged centerbody 21 is added that contains fuel cells, ram air heat exchanger and associated components. Underwing hydrogen storage tanks 22 are added beneath the wing near the wing tips at motor pylon locations #2 and #13 where two of the electric motor/propeller drive units are removed. A side view of the standard avionics pod, which hangs below the wing at each panel joint on the prior art Helios HP01 configuration is provided in FIG. 3. This pod measures 10.5 feet in projected length 31, is one foot wide at its maximum width when viewed from above (not shown) and has an enclosing surface fabricated from thin sheet material. A side view of the primary hydrogen/air fuel cell pod which is mounted on the centerline of the prior art Helios HP03 configuration is provided in FIG. 4 with the fuel cells 41 and ram air heat exchanger 43 noted. This pod is 16.5 feet in projected length 42, measures three feet wide at its maximum width when viewed from above (not shown) and has an enclosing surface fabricated from thin sheet material.

Figure 5:
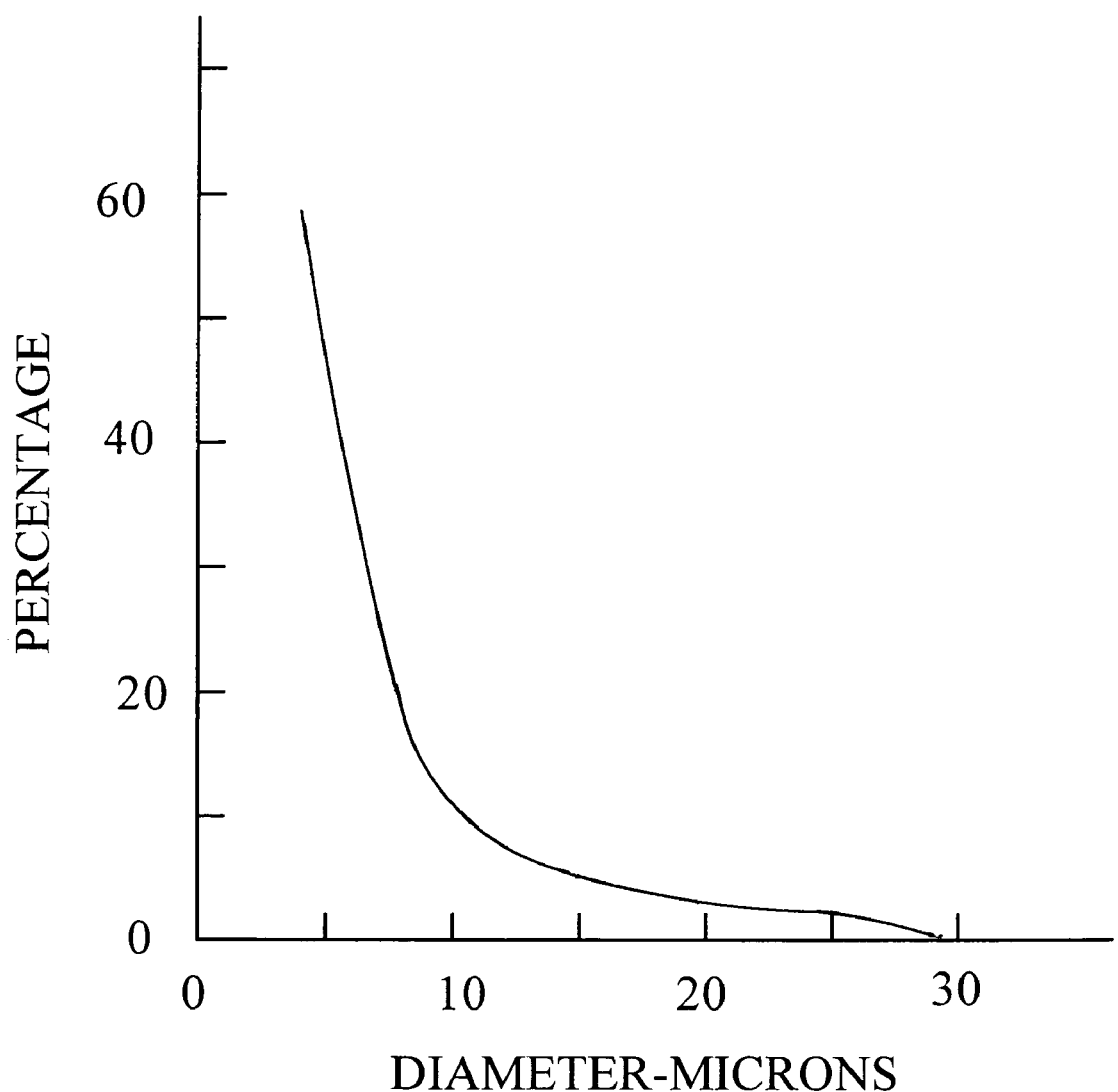
FIG. 5 is a graph of the present invention of stratospheric particles distributed according to size as reported in Reference 1.

The existence of dust particles in the earth's atmosphere was confirmed in the late 1950's in a series of aircraft stratospheric sampling flight tests conducted with instrumentation carried by B-52, U-2 and F-104 aircraft under the direction of the Smithsonian Institute[1,2]. Sampling of the atmosphere by the Smithsonian Institute was for the purposes of identifying the existence of particles with extraterrestrial origin with the measurements taken in the altitude range from 40,000 feet (12.2 km) to 90,000 feet (27.4 km). In sampling, the Smithsonian Institute's technique was to take samples with filters that were exposed to the atmosphere in flight and then carry the filters back to the laboratory for examination to find the extraterrestrial particles. Since the filter samples collected all the existing particles in the atmosphere when opened including the extraterrestrial particles when exposed, they also provided a complete inventory of dust particles in the earth's atmosphere. FIG. 5 is a graph[1] of stratospheric particles distributed according to size as measured between 40,000 feet (12.2 km) and higher in the Smithsonian Institute experiments. The graph, which plots percentage of stratospheric particles on the vertical scale against particle diameter in microns on the horizontal scale, shows that particles with sizes from a few microns in diameter up to near 30 microns in diameter exist in the earth's atmosphere in this altitude range. Examination (not described herein) of the collected dust particles established that a majority of them were terrestrial in origin and composed of crustal ingredients of quartz and/or silicon.

Figure 6:
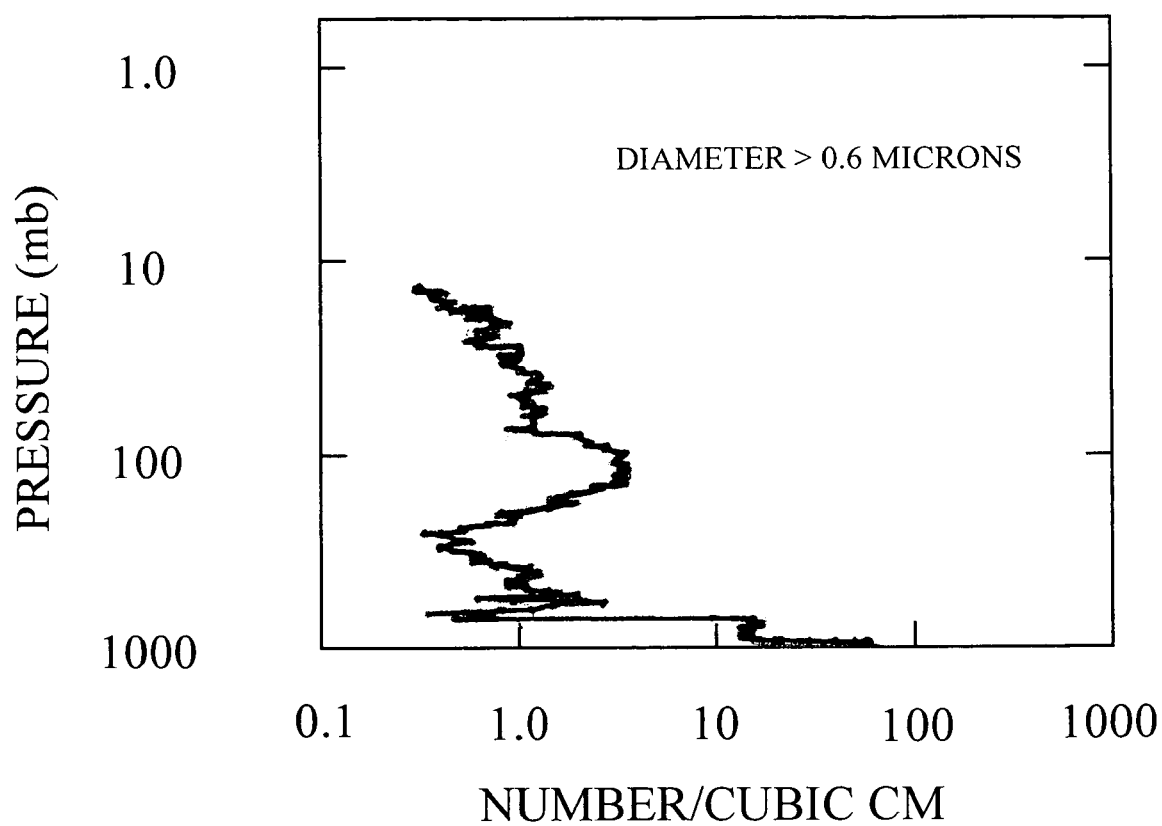
FIG. 6 is a graph of the present invention of the dust particle population in the atmosphere as reported in Reference 3.

The existence of a continuous vertical dust profile from sea level to near 100,000 feet (30.5 km) altitude was established through balloon flights carrying photoelectric particle detection devices[3]. An example of data taken during those experiments is provided in FIG. 6 which demonstrates a continuous presence of dust particles over the altitude range from sea level to near 100,000 feet (30.5 km) with a peak in the dust particle population occurring near sea level and a second, extended peak between 300 mb (30,000 feet, 9.1 km-altitude) and 70 mb (58,000 feet, 17.7 km-altitude). The extended peak between 30,000 feet (9.1 km) and 58,000 feet (17.7 km) is in the altitude band expected for flight by a future continuous duration solar powered aircraft.

Now, the actual process of the continuous duration solar powered aircraft colliding with dust particles in the earth's atmosphere is considered. An example calculation is described below for the present invention which answers the question of whether all dust particles in the path of the continuous solar powered aircraft collide with it, whether part of the dust particle population collides with it or none of the dust particles. As is shown below, all dust particles in the size range found in the earth's atmosphere, a few microns to near 30 microns in diameter, collide with the aircraft's leading edge at all altitudes at full power flight velocities. Since the size of the leading edge is representative of other forward facing aircraft surfaces and other protuberances from the aircraft, the results shown for the leading edge also demonstrate that these other surfaces and features also collide with all of the dust particles in the aircraft's path and produce static charge.

The actual trajectory of a dust particle moving toward any aircraft is determined by the shape of the streamlines of the air passing over and around the aircraft and the interaction of the streamlines of the airflow with the dust particles contained in the airstream. The interaction between the dust particle and the streamlines of the airflow depends on the initial momentum of the dust particle; momentum being defined as the product of the velocity of the dust particle and its mass. The trajectories of dust particles with large initial momentums are not effected by changes in airstream direction; they continue in a straight line and impact the aircraft. The trajectories of dust particle with very low initial momentum are influenced by changes in airstream directions, follow those streamlines and do not make contact with the aircraft except for those dust particles on the stagnation streamline that always comes to a stop against the aircraft.

An analytical method[6] exists for the calculation of the possible contact of raindrops with an aircraft passing through a cloud and that method is adapted for the present invention to evaluate the possibility of dust particles making collisions with the continuous duration type solar powered aircraft which is of interest here. Reference 6 also provides a mathematical equation which is adapted for the present invention to evaluate the minimum dust particle size that always makes contact with the aircraft for a given size feature of the aircraft. A feature being defined as some aircraft element such as the shape and size of the fuselage nose of the aircraft if it has a fuselage, or the shape and size of the wing leading edge or the shape and size of any protuberance sticking out into the airstream from the aircraft which creates the possibility of a collision with a dust particle. Also, any dust particle in the path of the aircraft with a size larger than the minimum size always collides with the aircraft.

Figure 7:
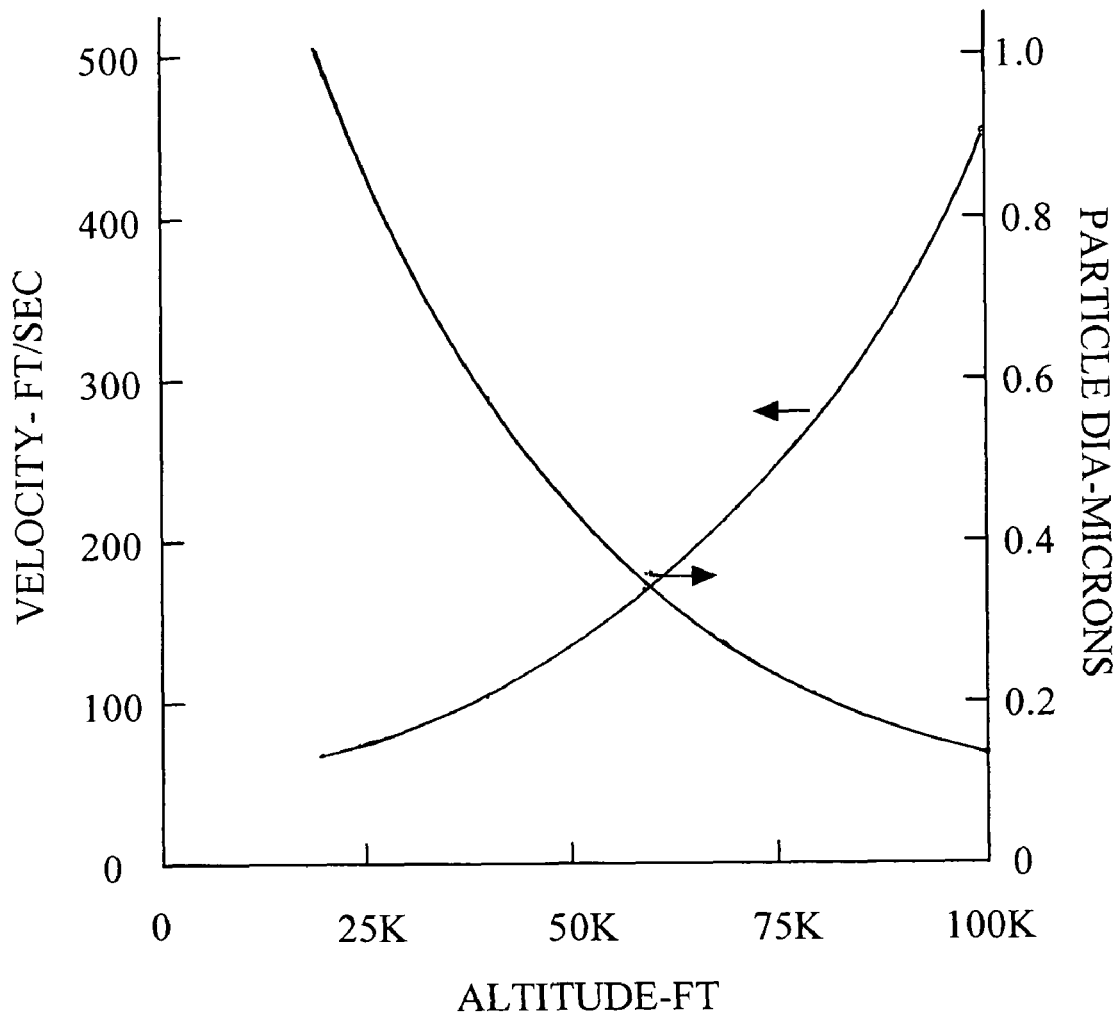
FIG. 7 provides graphs of the present invention illustrating the flight velocity/altitude history at maximum power of a high altitude solar powered aircraft of the Helios HP01 type and the minimum diameter dust particle that collides with the vehicle's wing leading edge.

An example calculation defining the minimum size of a spherically shaped dust particle for the present invention that always collides with the wing leading edge of a continuous duration high altitude solar power aircraft is carried out for the present invention assuming that the aircraft is of the Helios shape, size, and weight, is of the Helios HP01 high altitude configuration, is powered by 14 electric motors as the Helios configuration HP01 was and flies at the velocities and altitudes that Helios flies at. Since data was not available for the Helios flight velocity versus altitude because of the meager amount of public information released by its developer AeroVironment Inc., an approximate velocity/altitude history at maximum power was calculated with the results shown in FIG. 7. The results displayed in FIG. 7 are calculated under the assumption that the net power introduced into the airstream by the 14 electrical motors operating at maximum output at 100,000 feet (30.5 km), after reductions in the total power for electric motor efficiency and propeller system efficiency, is equal to the aircraft's flight velocity times the aircraft's total drag. A velocity of 455 ft/sec at 100,000 feet (30.5 km) at maximum input power of 21 kW to the electric motors is calculated with the maximum velocity decreasing as shown with decreasing altitude, reaching 70 ft/sec at 20,000 feet (6.1 km).

With flight speed now known versus altitude, the minimum dust particle diameter in microns for the present invention that always collides with the solar powered aircraft's wing leading edge is calculated with the results also shown in FIG. 7. The calculation shows that at 100,000 feet (30.5 km) altitude, any dust particle with a diameter equal to or greater than 0.13 microns strikes the aircraft's leading edge. The minimum dust particle diameter for collision with the wing leading edge is found to increase as the flight altitude is lowered; reaching about one micron at 20,000 feet (6.1 km). The equation[6] used for these calculations is:

$$K_{cr}(dU_x/dx)=0.25$$

with $K_{cr}=(2/9)$ (rho/rho$_1$) $(a/c)^2$(Uc/nu)
where: rho is the density of the particle.
rho sub 1 is the density of the air at the specified altitude.
a is the radius of the dust particle.
d=2a is the diameter of the dust particle.
c is the wing chord length.
Uc/nu is the Reynolds number where nu is the kinematic velocity of the air.
dU/dx is the velocity gradient along the stagnation streamline evaluated at the stagnation point of the feature that is under consideration of being struck by a dust particle.

Calculations of the minimum dust particle size for collision of a dust particle with the aircraft's leading edge, are summarized in FIG. 7. These calculations show that collisions of the leading edge of a continuous duration solar powered aircraft of the Helios type with dust particles in the earth's atmosphere are expected for all particles of the sizes found in the Smithsonian Institute dust particle measurements carried out between 40,000 (12.2 km) and 90,000 feet (27.4 km). Thus, static charge is generated along the entire leading edge of the wing thru collisions with dust particles for a wing leading edge fabricated from a dielectric material such as styrofoam, the material used in the Helios aircraft. In the present invention, the static charge on the leading edge is collected by placing a thin, lightweight open metal mesh, or electrode equivalent on the surface of the wing leading edge and connecting the mesh or its equivalent to a static charge storage device. Since Cirrus cloud ice particles are substantially larger than dust particles at the operating altitude near 50,000 feet (15.2 km) of a continuous duration solar powered aircraft, ice particles in its path will always impact the aircraft.

Figure 8:
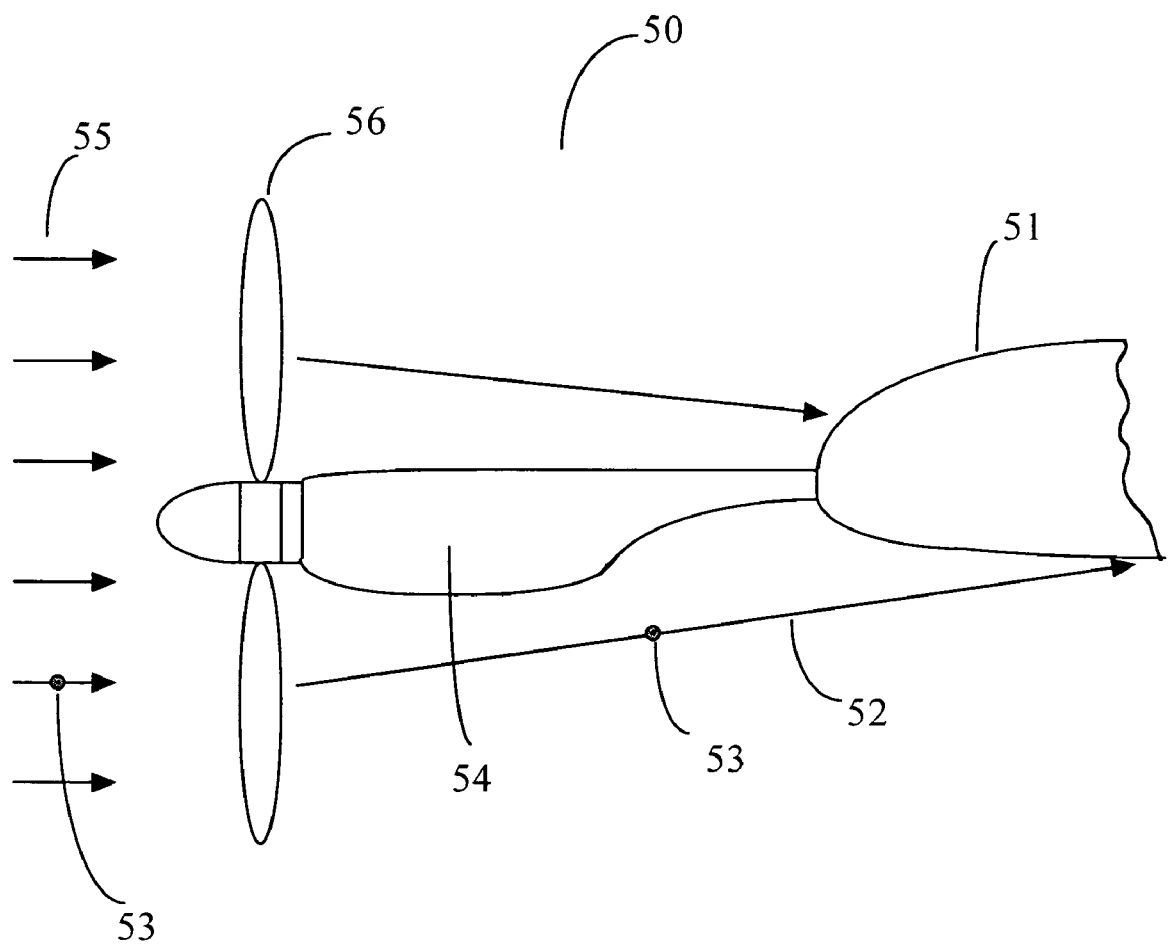

14 propellers, each two bladed and driven by an electric motor, are mounted along the leading edge of the wing of the Helios HP01 high altitude aircraft and used to power the aircraft in flight. As shown in FIG. 8, the electric motors 54 driving the propellers on the unmanned Helios aircraft (and also on the manned Solar Impulse aircraft) are cantilevered forward from the wing and place the propeller disk 56 in front of the wing 51. In operation, the propellers accelerate a circular cylinder of air, from now on referred to as a swath of air, and cause it to flow over the wing behind the propeller with the width of the swath near the diameter of the propeller disk; which for Helios HP01 was 79 inches.

Figure 9:
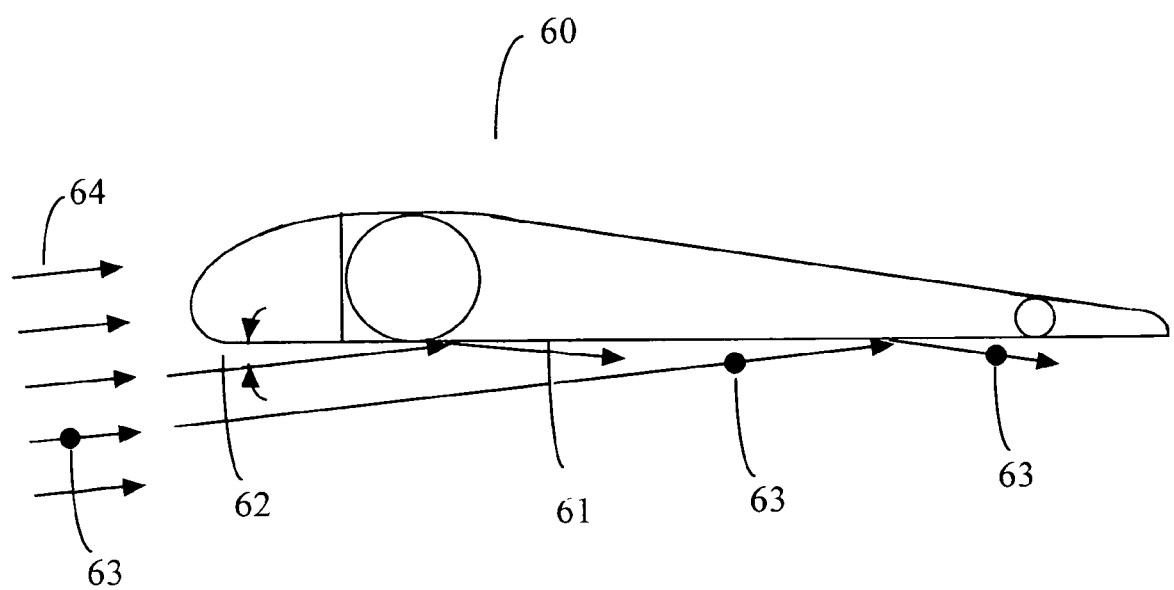

The effect of the propeller is also to cause a portion of the free stream airflow 55 and particles (not shown) in the airflow above the rotational axis of the propeller to bend downward toward the wing surfaces causing some particles to strike against the solar array on the upper wing surface as well as causing some particles 53 in the airflow below the axis of rotation of the propeller to bend upward 52 and strike the underside of the wing as shown in FIG. 9. In both cases, the impact of these particles on the upper solar array or on the lower wing surface generates static charge. From a global view, the airflow over the wing, from wing tip to wing tip, consists of 14 swaths where the propellers influence the airflow and the particle trajectories in the air flow, with each swath separated from the next swath by normal airflow over the wing unaffected by the action of the propellers. Thus, a total of 92 feet of the leading edge of the overall 247 foot wing span is under the influence of the propellers causing static charge to be generated on the aircraft leading edge; an area of about 90 square feet. On the remaining portion of the wing where the flow is not influenced by the propellers, FIG. 8, particles strike directly on the leading edge surface and produce a static charged area of an additional 150 square feet. An example of the trajectory 52 followed by a particle 53 passing through the propeller disk is illustrated in FIG. 8.

Figure 10:
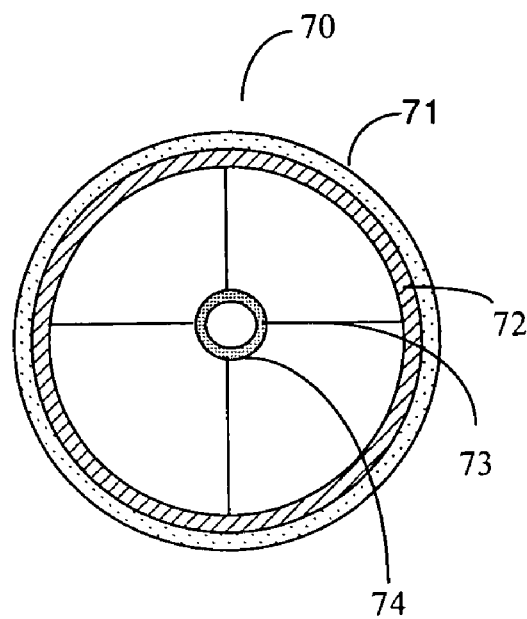

In the swath areas, the effect of the propellers is to generate a swirl in the flow, induce a contraction of the streamlines, increase the velocity of the air and the particles, and cause the particles to follow trajectories down toward the wing surfaces which end with collisions of the particles with the wing's surfaces producing static charge. Since the propellers operate continuously, impacts of particles in the swath areas generate static charge in a continuous process both day and night. Static charge generated in the swath areas on the lower wing surface is collected in the present invention by adding electrodes to the surface of the wing; the electrodes in turn connected to static charge storage devices in the aircraft. Collection of the static charge may also be accomplished in the present invention by a different method; by constructing the lower wing surface with a material or coated material with sufficient electrical conductivity that the static charge is mobile enough to be siphoned off to static charge storage devices As shown in FIG. 9, the wing of the continuous duration solar powered aircraft flies with a slight nose up angle, known as the angle of attack 62, with respect to the oncoming free stream flow 64 to generate the lift required to support the aircraft in level flight; for the Helios vehicle this angle is approximately 2.6 degrees based on assumed characteristics for the airfoil. Again, this estimate is based on best guessed airfoil characteristics since such information has not been released publicly by AeroVironment Inc., the developer of the Helios vehicle. Particles in the airflow that directly strike the lower wing surface in wing areas not influenced by the propellers are depicted in FIG. 9. For example, a particle 63 follows the trajectory noted in FIG. 9. Direct particle collisions with the lower wing surface as depicted in FIG. 9 also generates static charge continuously both day and night if the lower wing surface is metallic surface or a dielectric surface such as that used in the Helios aircraft. In the latter case, the static charge is collected in the present invention by one or both of the techniques mentioned above for collection of static charge generated on the lower wing surface in the propeller swath areas. These incident particles 63 follow straight line trajectories and impact against the underside of the wing producing static charge on an area of about 1300 square feet.

The all-wing Helios aircraft in configuration HP01 is assembled in six sections. An underwing avionics pod, FIG. 3, is attached at each panel joint to carry landing gear, battery power system, flight control computers and data instrumentation. Should the future continuous duration solar powered aircraft also employ such pods, the present invention equips these pods with thin metallic or dielectric surfaces and collects static charge generated on the pod surfaces by one or both of the methods mentioned previously for static charge collection in the lower wing surface swath and non-swath areas. For the Helios vehicle in configuration HP03 with an enlarged centerline mounted fuel cell pod, FIG. 4, the present invention also equips that pod with thin metallic or dielectric surfaces and collects static charge generated on those surfaces too.

Static charge is generated on the upper wing surface solar array both by the action of the propellers on passing particles and to a lesser degree in non-propeller swath areas by particles striking the solar array under the influence of normal aerodynamic forces. The airflow over the upper wing surface and its solar array is physically separated from the wing surface by a boundary layer and if the boundary layer is laminar, the velocity of the airflow is nearly tangent to the surface and decreases through the boundary layer from free stream velocity down to zero velocity at the wing surface. Such a layer may minimize the number of particle collisions with the solar array and the generation of static charge. If the boundary layer is turbulent, mixing is occurring in the boundary layer and the number of particle collisions producing static charge may increase somewhat over that of a laminar boundary layer. Since the solar powered aircraft is operating in the stratosphere where clear air turbulence exists, the aircraft is jolted vertically during flight by the clear air turbulence causing the solar array to collide with passing particles and the generation of static charge on the solar array. It has been reported that unmanned vehicles such as the Golden Hawk vehicle, which operates at altitudes near 60,000 feet, have experienced trouble operating under autopilot control due to motions induced by encounters with clear air turbulence at that altitude.

Collection of static charge on the upper wing solar array's surface due to collisions with particles is realized in the present invention by utilizing the solar array's normal metallic electrode system and by adding a thin conductive layer, for example, of polysilicon on top of the solar cells normal silicon oxide surface layer to assure that static charge produced by collision with particles can migrate to the existing metallic solar cell electrodes for collection.

Values quoted in the literature for the dc resistivity of silicon oxide are in the range from $10^{14}$-$10^{16}$ (ohm-cm) which translate into electrical conductivity values of $10^{-14}$-$10^{-16}$ ($Scm^{-1}$) since conductivity is defined as the reciprocal of resistivity. With regard to undoped polysilicon, values for its electrical conductivity, for example, are contained in Reference 7 as $3.65\times10^{-6}$ $(ohm\text{-}m)^{-1}$ or $8.41\times10^{-4}$ $(ohm\text{-}cm)^{-1}$ after annealing for two samples originally deposited at 570° C. and 620° C., respectively. Doped polysilicon has even higher electrical conductivity with values, for example, in the range from 2-400 (5 $cm^{-1}$) as quoted in Reference 8. Thus, a thin coating of polysilicon offers increases in electrical conductivity which are roughly 8 to 12 orders of magnitude greater than silicon oxide if undoped and 14 to 16 orders of magnitude greater if doped. Polysilicon is seen to offer a wide range of electrical conductivities which may be utilized for the subject polysilicon coating of the present invention. Polysilicon is also known (not shown) to be a physically sturdy material. The higher electrical conductivity of the polysilicon or equivalent coating that is added assures static charge migration to the existing solar cell electrodes and the polysilicon layer that is added to assure static charge collection on the upper wing surface solar array does not effect solar cell operation during the day.

Structural design of a continuous duration solar power aircraft is a challenge due to the large physical size of such a vehicle, the need to keep the structure of such a vehicle as light as possible and the need to carry loads acting on the aircraft over large distances while achieving an efficient structural approach.

Based on photographs taken of the Helios HP03 aircraft disintegrating in flight and released as part of the accident analysis investigation conducted by NASA following the crash of the vehicle, the Helios aircraft uses a large hollow, carbon fiber tubular structure, located just behind its styrofoam leading edge and running from wing tip to wing tip, as the major structural load carrying member. In addition to the carbon fiber tube and wing ribs, a smaller structural member, located just in front of the wing's trailing edge control surfaces, is also seen in the photographs.

Should the future continuous duration solar powered aircraft use a structural approach similar to that utilized in the Helios aircraft, a large hollow carbon fiber tube located along the leading edge of the wing and a smaller structure located along the wing's trailing edge, the present invention converts these structures into static charge storage devices. This is accomplished by designing them to function as cylindrical capacitors in one of several ways as illustrated, for example, in FIG. 10 and FIG. 11. A cross-sectional cut thru the tube is illustrated in FIG. 10, 70. In this illustration, the principal structural element in the Helios aircraft, the large hollow tube 72, is known to be constructed of carbon fiber with overwraps 71 of Kevlar and Nomex for added strength. Since carbon fiber has high electrical conductivity, the large hollow carbon fiber tube 72 is used in the present invention as one of the cylindrical capacitor electrodes. As shown in FIG. 10, one approach used in the present invention to convert the structural tube into one electrode of a cylindrical capacitor, is achieved by inserting a smaller metallic or electrically conducting carbon fiber tube 74 in the center of the larger tube 72 to act as the second electrode of the cylindrical capacitor. The smaller tube is supported in the center of the larger tube on optional insulators 73 if it is not strong enough itself to support the forces acting upon it.

Figure 11:
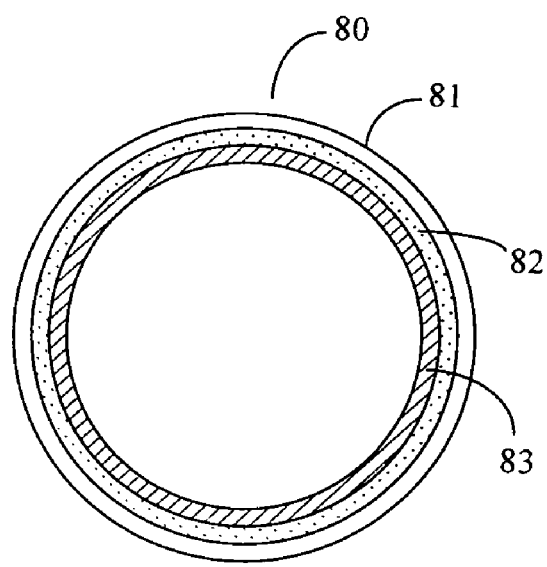

Another method for providing a second electrode for use in conjunction with the larger carbon fiber structural tube in the present invention is illustrated in FIG. 11. The large electrically conducting carbon fiber tube 83 in this example acts as the inner electrode of a cylindrical capacitor. The carbon fiber tube 83 is then overwrapped with an electrical insulation layer 82 such as Kevlar or Teflon; the insulation layer acting as the dielectric between the inner and outer electrodes of the cylindrical capacitor as well as adding additional strength. Finally, an overwrap 81 of electrically conducting carbon fiber or metallic material is added over the electrical insulation layer 82 to form the outer electrode of the cylindrical capacitor. For the case of the large structural carbon tube running continuously from wing tip to wing tip in HP01, a single cylindrical capacitor is formed by either technique illustrated in FIG. 10 or FIG. 11.

If the large structural carbon tube is broken up into six segments, each used to support one 41 foot long wing panel, and the tube segments are electrically insulated from each other at the mechanical joint between tube segments at the panel ends, six cylindrical capacitors are formed for the storage of static charge. In the present invention, similar approaches to those previously discussed for the transforming the large carbon fiber tube into a cylindrical capacitor are applied to a smaller carbon fiber structural tube running from wing tip to wing tip and located near the wing's trailing edge. When this is done, an additional full length single cylindrical capacitor is formed or an additional six capacitors formed if the smaller tube is electrically segmented into 41 foot lengths.

The present invention also designs all structural members of a continuous duration solar powered aircraft with the objective of using them for the storage of static charge. For example, coaxial carbon fiber tubes, when used in the structure, are built with electrodes on the outer surface of the inner cylinder and on the inner surface of the outer cylinder so they may also act as capacitors for the storage of static charge. If I-beams are used as structural members, they may be converted into capacitor storage devices by adding facing electrodes on upper and lower web surfaces.

Figure 12:
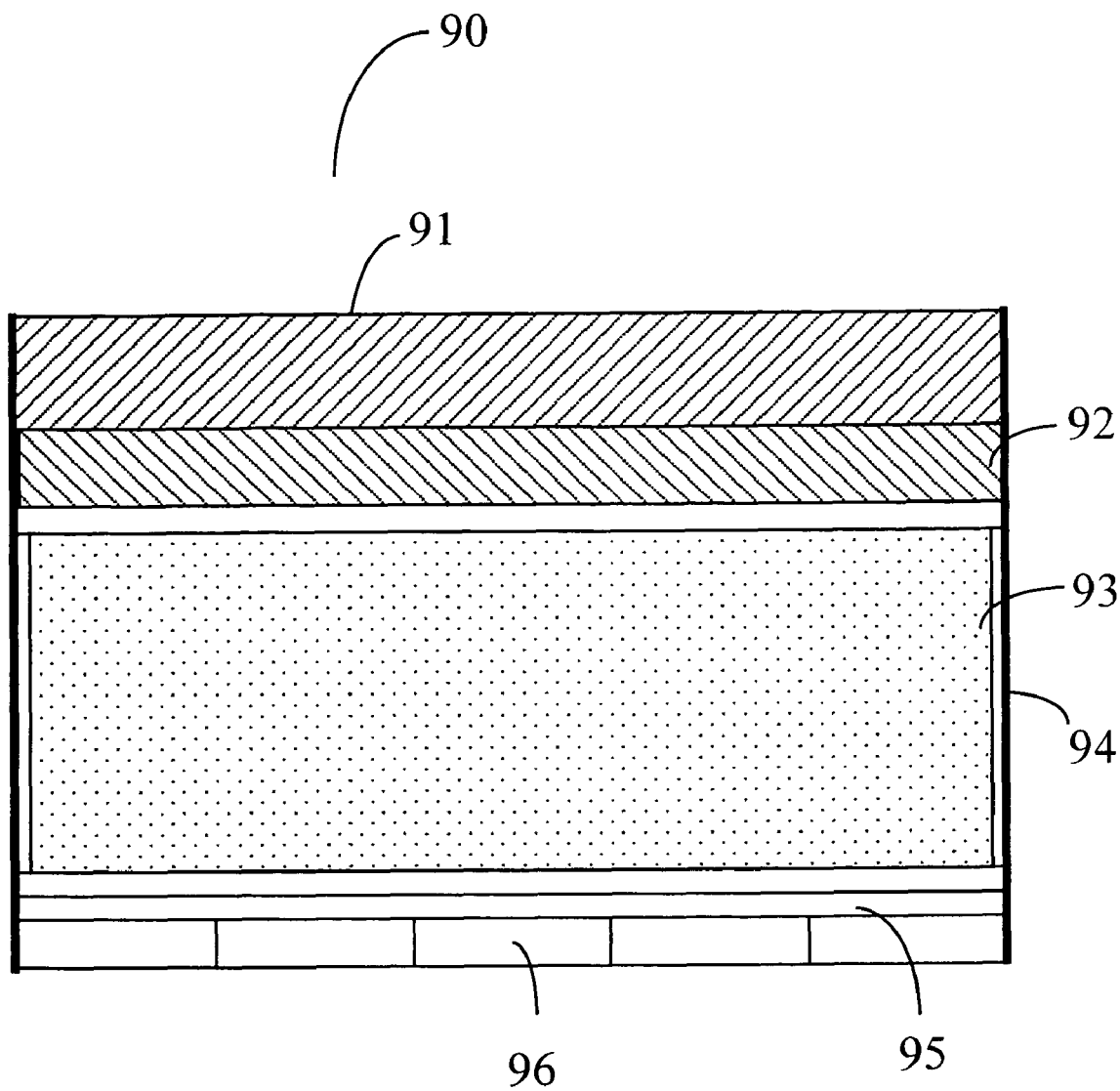

The present invention includes another method for incorporating static charge storage devices into a future continuous duration solar powered aircraft by utilizing the free volume within the wing of the aircraft as illustrated in the wing planform drawing, FIG. 12. In the approach illustrated, parallel plate sheet capacitors 93 are installed between the wing's ribs 94 or between the ends of a wing panel (not shown). Also shown in FIG. 12, are the wing leading edge formed from sculptured styrofoam 91, the larger hollow tubular structural members 92 and the smaller structure 95 and the elevator surfaces 96. Metallized Kevlar cloth is one example of the material to be used in the present invention to form sheet electrodes 93 for the capacitor.

Figure 13:
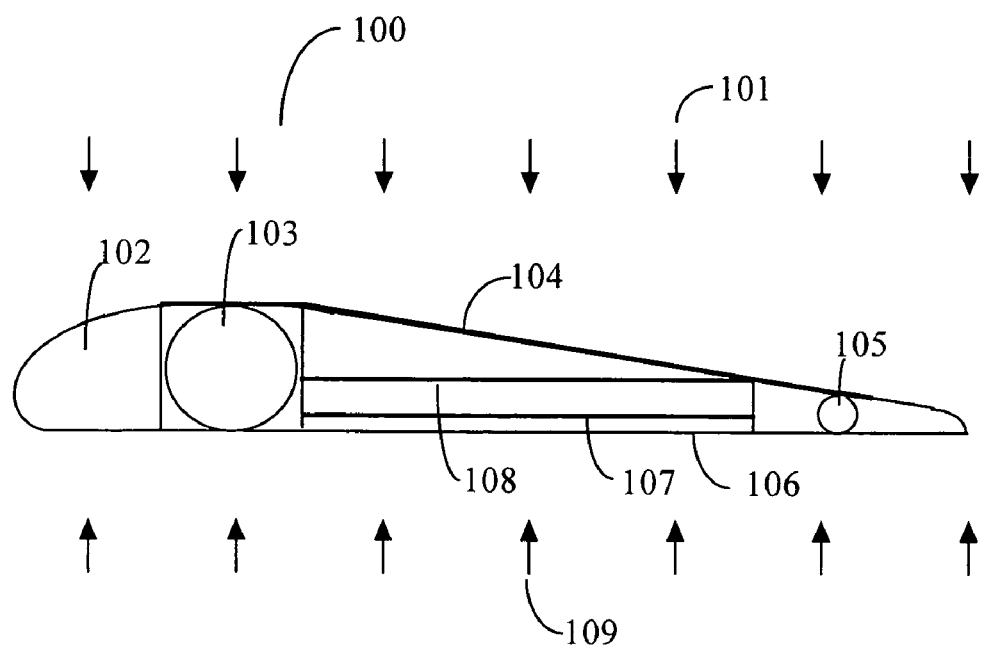

FIG. 13 illustrates the installation of parallel sheet capacitors in the wing of an aircraft, as viewed in a cut thru the wing. The case for solar cells 104 effective to incident solar radiation 101 from only one side is illustrated in FIG. 13. For this case, the incident solar radiation from below 109 may be blocked without detrimental effects by the presence of the sheet capacitors since the array only collects solar energy incident from above the array. The cross-sectional view FIG. 13 thru the wing includes the following features: formed styrofoam leading edge 102, main structural tube 103, solar array 104, smaller structural support 105, lower wing surface 106, and parallel plate capacitor formed by metalized sheet electrodes 107 and 108.

Figure 14:
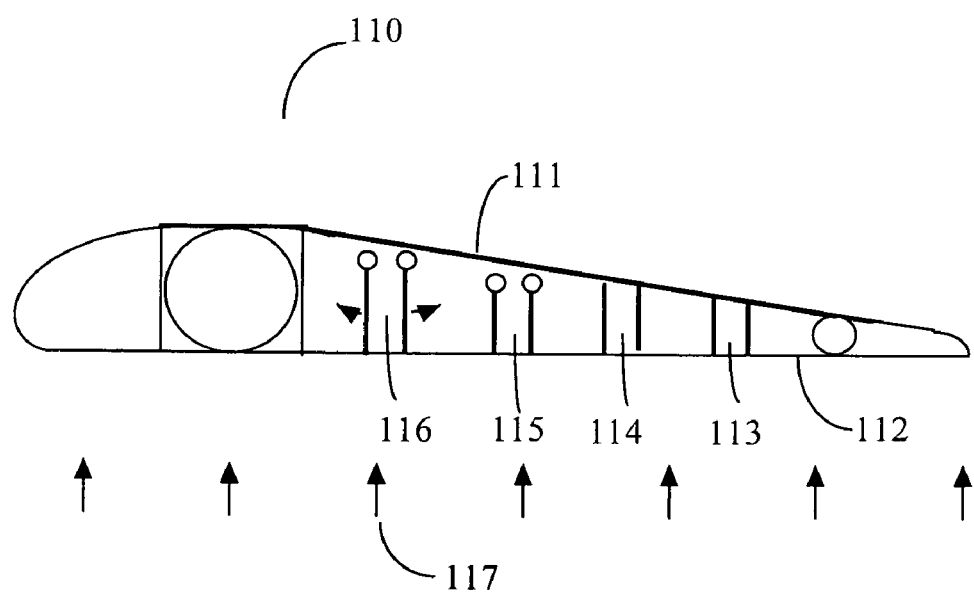

Sheet type static charge storage capacitors are also provided in the present invention for an aircraft utilizing a bifacial solar array 111 as illustrated in FIG. 14. For bifacial solar cells 111 that accept solar radiation on both sides, fixed sheet capacitors are positioned vertically in the wing as illustrated by example capacitors 113 and 114. The vertical sheet capacitors allow incident solar radiation from below 117 to pass unimpeded to the backs of the bifacial solar cells after passing thru the transparent lower wing surface.

In a separate example shown in FIG. 14 for an aircraft using bifacial solar cells, the vertical sheet capacitors of the present invention are also hinged as shown in example capacitors 115 and 116. The hinges allow capacitors of type 115 and 116 to be rotated in flight to maximize the amount of solar energy incident on the backside of the bifacial solar cells.

There are a number of uses that the extra electric energy from the collection of static charge may be applied to. These uses range from providing high voltage DC power for propulsion assistance to low DC voltages for the powering of electronic chips and electronic devices. Some form of electrical power is needed, for example, to operate navigation, taxi, and landing strobe lights, data transceivers, communication gear, transponder and other electrical equipment. Power is also needed, for example, to operate the aircraft's flight control system and autopilot, to monitor propulsion system performance, and to communicate with the ground control center from which the aircraft is being controlled. Electric power from the extra electric energy realized from the collection of static charge may also be used to provide a backup supply of power for emergency use. The kind of power, DC and/or AC, and the required voltage of the power that is needed depends on the details of systems and components utilized in the continuous duration solar powered aircraft.

DC power requirements may be met in a number of different ways: all the way from using DC to DC motor generator sets to the conversion of DC to AC and then back to DC by combinations of inverters, transformers and rectifiers. Requirements for DC power may range from voltages of hundreds of volts down to the 3 volt to 5 volt range or lower to power electronic chips and electronic devices.

Many existing aircraft systems utilize 28 volt and/or 270 volt DC power and/or 400 Hz AC power. DC and AC electrical power may be used by aircraft sensing systems and aircraft status monitoring systems. AC power may be needed that ranges from many volts to a few volts and from 60 Hz to 400 Hz or higher frequency depending on the application.

If the static charge is collected and stored at voltages in the range from 200 to 380 volts in the present invention, a number of off-the-shelf military qualified and commercial converters are available that can supply isolated, regulated and fully safeguarded DC electrical output power at steps in voltage from 3.3 volts to 100 volts DC or in steps to 350 volts DC; typical devices are manufactured by PICO Electronics Inc. of Pelham, N.Y. This firm also manufactures 400 Hz transformers operating with 115 volt and 26 volt primary inputs. If lower DC storage voltages are available from the Extra Electric Energy System and these voltages are in the range usually generated by solar PV systems, there are a number of available inverters that convert DC to 60 Hz, 110 volt AC power, if that power can be used by the application.

There is also an unconventional approach that directly converts DC voltages in the range from 1 to 30 kV into normal electronic voltages at power levels from milliwatts to watts. This approach is based on a spark gap method in which the spark is discharged into the primary of a high voltage transformer. The resulting pulse is transferred to the secondary of the transformer and thence into a storage capacitor, via a Schottky diode. Output voltages of a few volts are achieved this way though the conversion efficiency of this approach is unknown to the present inventor.

Figure 15:
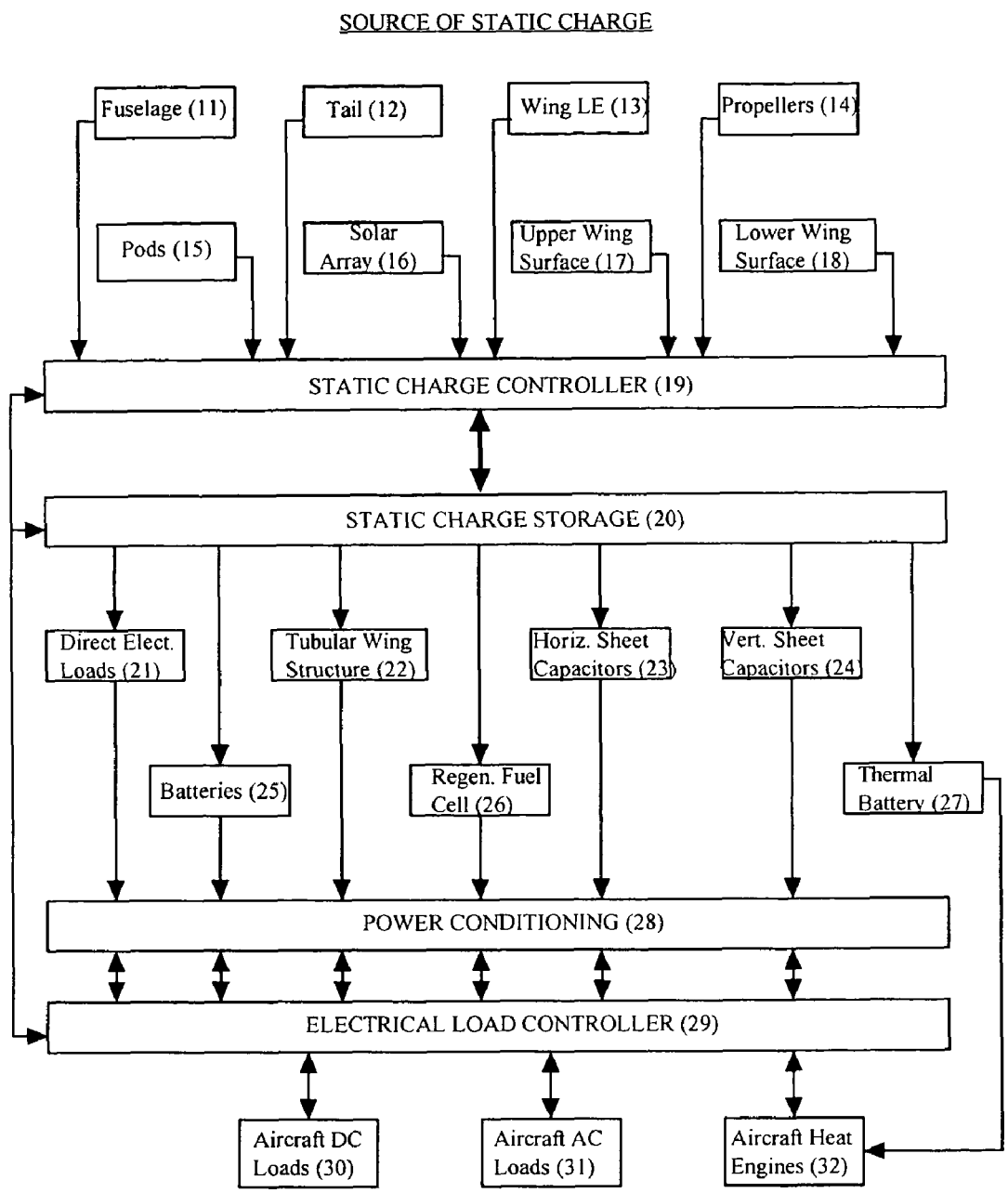

A block diagram for the present invention is provided as FIG. 15. The sources of possible static charge on the continuous duration solar powered aircraft are noted at the top of the block diagram and include the fuselage (11), the tail (12), the wing leading edge (13), the propellers (14), pods (15), solar array (16), upper wing surface (17) and lower wing surface (18). A static charge controller (19) operates to determine where to store the incoming collected static charge. To make the determination, an electrical load controller (29) located downstream of the power conditioning equipment (28) and supplied with knowledge of the present state of charge of the individual static charge devices, the rate of incoming static charge and the amount of electrical power that is directly required by the aircraft, sends instructions to the static charge controller (19) which in turn switches the incoming power as directed.

The electrical load controller (29) decides what amount of static charge to send directly to the aircraft loads (30) and (31) via the power conditioning equipment (28) or to store in aircraft located capacitors (22), (23) and (24), batteries (25), regenerative fuel cell (26) or to the thermal battery (27), if these components make up the static charge storage devices. Whatever electrical energy is provided directly for use by the aircraft or is provided latter from static charge storage devices, the electrical energy is first conditioned by passing it through power conditioning equipment (28) on its way to aircraft DC (30) and AC (31) loads The electrical load controller (29), located downstream of the power conditioning equipment, oversees these decisions and switches the incoming electrical power as required.

The electrical wiring layout (not shown) for the static charge power system of the present invention is unique from the point of view of the versatility and flexibility incorporated in it. Since the electrical currents are reasonably small flowing to and from the static charge storage devices, power conditioners and controllers used in the present invention, the various components comprising the system are netted together with multiple wires with little associated weight gain. Each of the static charge storage devices is instrumented in the present invention with electric current sensors and voltage and capacity sensors that provide a continuous data stream to the Electrical Load Controller (29) of the value of electric current flowing into and out of a given storage device and its present state of charge. Software in the Electrical Load Controller (29) computer then selects the most appropriate static storage device to store new static charge and then switches the wiring network to accomplish the required connection. It also selects the most appropriate power conditioning unit to condition the electric power for the Dc and AC aircraft loads.

The Electrical Load Controller (29) also continuously monitors power usage by aircraft components and shuts appropriate components down during periods of low power availability while keeping critical components powered. The Electrical Load Controller (29) also includes software that makes use of the known location of the solar powered aircraft above the earth's surface based on GPS or other measurements of the aircrafts longitude, latitude and altitude, and uses this information along with aircraft heading, time of day and knowledge of atmospheric winds to plan the continuing mission and the future allocation of power needed from the static charge electrical power system.

I claim:

1. An Extra Electric Energy System for collecting the static charge that forms in flight on the external surfaces of a continuous flight duration, day/night cycle solar powered aircraft when the aircraft collides with particles in the earth's atmosphere including but not limited to dust, fog, rain, sleet, snow, ice and volcanic ash particles, hereafter referred to as particles, and for using a portion of or all of that electrical energy immediately to power aircraft systems requiring electrical power or to store the remaining electrical energy in the aircraft for future use comprising:

means to provide a continuous duration day/night cycle solar powered aircraft with extra energy by tapping a previously unrecognized source of energy: the static charge forming on the aircraft due to collisions of the aircraft with particles in the troposphere and stratosphere regions of the earth's atmosphere, means to enhance the production of static charge on the aircraft's surfaces if those surfaces do not normally produce sufficient static charge by substituting surface materials or coatings such as dielectrics that produce enhanced amounts of static charge, means to collect the static charge that is formed on the surfaces of the aircraft by collisions with particles in the earth's atmosphere by equipping those surfaces with electrodes that capture the static charge or by making the surfaces from materials or by coating those surfaces with materials that have sufficient electrical conductivity to allow the static charge to migrate over the surface to static charge collection points which are in turn connected electrically to static charge storage devices within the aircraft, means to store collected static charge in aircraft located static charge storage devices in the form of capacitors and batteries and thru the cyclic formation of consumables during the day for use in an onboard regenerative fuel cell which are then stored and used later or at night in the fuel cell to produce electrical power and for storage as heat in thermal batteries to power heat engines such as Rankine-Brayton and/or Stirling engines, means to store the collected static charge in the structure of the aircraft by transforming the structure where possible into static charge storage devices in the form of flat plate capacitors, cylindrical capacitors, and/or capacitors of different shapes or equivalent storage devices, means to store the collected static charge in the aircraft by mounting multi-sheet flat plate capacitors or equivalent in the aircraft's fuselage and/or wing volume, means to use the electrical power immediately or after storage to meet extra electrical power requirements of a continuous duration, day/night cycle solar powered aircraft including its emergency power needs, means to transform the stored static charge into useful DC and AC electrical power and the use of that electrical power to supply aircraft electrical needs both in the daytime and at night, means to control the collection of static charge, its distribution to static charge storage devices and/or its immediate use, the choice of the most appropriate storage device for storage of the incoming static charge, its conversion to the needed type of electrical power and projections of future electrical usage requirements by an onboard Electrical Load Controller containing a computer with dedicated software which is also provided with information regarding the status of all aircraft systems that might use electricity from the Extra Electric Energy System.

2. The Extra Electric Energy System recited in claim 1 further comprising the collection of static charge forming on aircraft surfaces which collide with particles in the earth's atmosphere including the nose of the fuselage and its tail if the aircraft has them, the wing leading edge, the solar array on the upper wing surface, pods hanging from or attached to the fuselage and/or wing, portions of the wing receiving hits of particles thru the action of the propellers, the propellers themselves, direct hits of particles to the underside of the wing in areas where the flow is not effected by the action of the propellers and direct particle collisions with aircraft bulges.

3. The Extra Electric Energy System recited in claim 1 further comprising the collection of static charge on the solar array which covers a majority of the wing's upper surface using the electrode system normally provided with the solar array by adding an additional coating such as polysilicon to the outer surface of the solar cells to increase their surface electrical conductivity and thus enhance the migration of static charge to the existing electrode system.

4. The Extra Electric Energy System recited in claim 1 further comprising equipping the solar powered aircraft's propeller propulsion units with propellers constructed from composite materials which generate static charge when they collide with particles in the earth's atmosphere, providing a means to collect that static charge by equipping the composite propellers with a set of electrically conducting electrodes and/or with an electrically conducting surface material which guides the static charge so produced by collisions of the propeller blades with particles to the propeller's metal or composite drive shaft, equipping the composite drive shaft with electrically conducting electrodes and/or coating that allows the static charge to migrate down the propeller shaft toward the drive motor and providing an electrically conducting collar positioned about the drive shaft which wipes the static charge from the metal or composite drive shaft and carries the static charge to static charge storage devices.

5. The Extra Electric Energy System recited in claim 1 further comprising means to store the collected static charge in the structure of the aircraft by transforming the structure where possible into static charge storage devices in the form of flat plate capacitors, cylindrical capacitors, and/or capacitors of different shapes or equivalent storage devices.

6. The Extra Electric Energy System recited in claim 1 further comprising means to store the collected static charge in the aircraft by mounting multi-sheet flat plate capacitors in the aircraft's fuselage and/or wing volume.

7. The Extra Electric Energy System recited in claim 1 further comprising means to use the electric power immediately or after storage to meet extra electrical power requirements of a continuous duration, day/night solar powered aircraft including its emergency power needs.

8. Apparatus for an Extra Electric Energy System with Static Charge Sources, Static Charge Controller, Static Charge Storage Devices, Power Conditioning Equipment, Electrical Load Controller, Aircraft DC Loads, Aircraft AC Loads, Aircraft Thermal Batteries and Aircraft Heat Engines comprising:

apparatus in the form of high resistance electrodes that are attached to the external surfaces of the aircraft and used to collect the static charge that is produced on those surfaces by the collision of the aircraft's metal or dielectric surface materials with particles contained in the earth's atmosphere, apparatus in the form of solar cells in the solar photovoltaic array which covers the upper wing surface of the aircraft and which are modified by the addition of a thin layer of electrically conducting material such as polysilicon to their external surface to allow the migration of the static charge to the existing set of solar array electrodes for collection, apparatus in the form of composite propellers that are used to generate static charge by collisions with particles with the static charge collected by a system employing electrodes on the propeller blades connected to the propeller shaft from which the static charge is electrically wiped off downstream and carried to a static charge storage device, apparatus in the form of structural tube fabricated with carbon fiber because of its light weight and strength or other electrically conducting material which is converted to static charge storage device by using the carbon fiber tube as a first electrode of a cylindrical capacitor with the second electrode provided either by a conducting element inserted lengthwise in the center of the structural tube or by adding an overwrap of insulation followed by another overwrap of conducting material to form the second electrode, apparatus in the form of aircraft structure modified in shape to form capacitors of various sizes and shapes, apparatus in the form of a network of wires that connect all elements of the Extra Electric Energy System with the Electrical Load Controller and its computer and which are used for communication between elements, carry information and data to and from the Electrical Load Controller and are used also to exercise switching commands from the Electrical Load Controller, apparatus in the form of a Power Conditioning System which conditions the static charge based electricity that it receives into the forms of DC and AC electricity to be used by the aircraft using combinations of inverter, transformer, and rectifier equipments, commercial off-the-shelf hardware and/or spark gap type converters, apparatus in the form of software contained in the computer of the Electrical Load Controller and used to operate and control the Extra Electric Energy System, apparatus in the form of information and data transmission and receiving radio units which communicate with the ground station controlling the solar powered aircraft.

9. An Extra Electric Energy System for a continuous flight duration day/night cycle solar powered aircraft which utilizes intrinsic atmospheric and aircraft properties in a combination not previously recognized comprising:

an element consisting of the aircraft itself which is a continuous generator of electricity through collisions of the aircraft with particles in the earth's atmosphere which produces static charge on the aircraft's external surfaces, an element that includes the construction of the continuous flight duration day/night cycle solar powered aircraft in a manner that requires that it be constructed from lightweight and strong space age materials which have the intrinsic property of generating static charge when they collide with particles in the earth's atmosphere with the construction of such a vehicle particularly driven to the use of thin dielectric plastic film materials for aircraft surface coverings to meet the restricted total weight requirements of such aircraft, an element that collects the static charge formed on the external surfaces of such an aircraft by attaching electrodes anywhere to a metal surface, by integrating a set of electrodes onto any dielectric's surface or by adding an electrically conducting coating to the dielectric's surface to facilitate migration of the static charge to the set of electrodes, an element that stores the collected static charge in static charge storage devices which allow removal of the static charge at a later time followed by power conditioning before use by aircraft systems needing electrical energy, an element that stores the collected static charge in capacitors and batteries in the aircraft, or uses the static charge to manufacture consumables for an onboard regenerative fuel cell or stores the static charge as heat energy in thermal batteries, an element that utilizes transformations in the aircraft's structure for possible locations for the storage of static charge by forming the structure, for example, into capacitor storage units of different physical shapes and sizes and/or by the addition of electrodes to the surfaces of the structure to enable static charge storage, an element for static charge storage utilizing flat sheet type capacitors mounted in the aircraft's fuselage or wing's volume, an element that collects the static charge on the solar array using the existing solar array electrodes without requiring the addition of a new set of electrodes with static charge migration enhanced by the addition of a thin layer of electrically conducting material such as polysilicon to the solar cells exterior surfaces which enhances migration of the static charge to the existing solar array electrodes and thence to static charge storage devices, an element that instruments both the Extra Electric Energy System and related aircraft systems that use electrical power from the Extra Electric Energy System and provides the information and data from the instrumentation system to the Electrical Load Controller, an element designated the Electrical Load Controller which monitors and changes the operating state of the Extra Electric Energy System based on the information that it receives.

10. The Extra Electric Energy System recited in claim 9 further comprising an element that utilizes transformations in the aircraft's structure for possible locations for the storage of static charge by forming the structure, for example, by the addition of electrodes to the surface of the structure to enable static charge storage.

11. The Extra Electric Energy System recited in claim 9 further comprising an element for static charge storage utilizing flat sheet type capacitors mounted in the aircraft's fuselage or wing's volume.

12. The Extra Electric Energy System recited in claim 9 further comprising an element that collects the static charge on the solar array using the existing solar array electrodes without requiring the addition of a new set of electrodes with static charge migration enhanced by the addition of a thin layer of electrically conducting conducting material such as polysilicon to the solar cells exterior surfaces which enhances migration of the static charge to the existing solar array electrodes and thence to static charge storage devices.

13. The Extra Electric Energy System recited in claim 9 further comprising propellers which are fabricated from composite material, which generate static charge when they collide with particles in the atmosphere, and which are equipped with electrodes that conduct the static charge to the propeller shaft where it migrates downstream and is wiped off by conductor on or around the shaft and carried to static charge storage devices.

14. The Extra Electric Energy System recited in claim 9 further comprising an Electrical Load Controller whose actions are computer controlled and which communicates to and fro with other elements of the Extra Electric Energy System including the Static Charge Controller, the Static Charge Storage Devices and the Power Conditioning Equipment, determines the operational status of the Extra Electric Energy System and controls the state of the system with respect to preset allowable values and alarm settings for component current, voltage, power factor, and line frequency parameters.

* * * * *